US010353051B2

(12) United States Patent
Takaki

(10) Patent No.: US 10,353,051 B2
(45) Date of Patent: Jul. 16, 2019

(54) APPARATUS FOR DETECTING AXIAL MISALIGNMENT OF BEAM SENSOR

(71) Applicant: DENSO CORPORATION, Kariya, Aichi-pref. (JP)

(72) Inventor: Ryo Takaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 294 days.

(21) Appl. No.: 15/117,660

(22) PCT Filed: Feb. 10, 2015

(86) PCT No.: PCT/JP2015/053701
§ 371 (c)(1),
(2) Date: Aug. 9, 2016

(87) PCT Pub. No.: WO2015/119298
PCT Pub. Date: Aug. 13, 2015

(65) Prior Publication Data
US 2016/0349356 A1 Dec. 1, 2016

(30) Foreign Application Priority Data

Feb. 10, 2014 (JP) .................. 2014-023686
Sep. 2, 2014 (JP) .................. 2014-178096
Jan. 7, 2015 (JP) .................. 2015-001552

(51) Int. Cl.
*G01S 7/40* (2006.01)
*G01S 13/86* (2006.01)
*G01S 13/93* (2006.01)

(52) U.S. Cl.
CPC ............ *G01S 7/4026* (2013.01); *G01S 13/86* (2013.01); *G01S 13/867* (2013.01);
(Continued)

(58) Field of Classification Search
CPC .... G01S 13/867; G01S 13/931; G01S 7/4026; G01S 13/86; G01S 13/89; G01S 7/40;
(Continued)

(56) References Cited

U.S. PATENT DOCUMENTS

2004/0046690 A1* 3/2004 Reeves .................. G01C 11/00
342/175
2004/0145513 A1 7/2004 Katayama et al.
(Continued)

FOREIGN PATENT DOCUMENTS

JP 2004-101347 A 4/2004
JP 2004-205398 A 7/2004
(Continued)

*Primary Examiner* — Olumide Ajibade Akonai
(74) *Attorney, Agent, or Firm* — Knobbe, Martens, Olson & Bear, LLP

(57) ABSTRACT

An apparatus for detecting axial misalignment of a beam sensor calculates, based on a result of first target recognition tasks by a beam recognition unit and a result of second target recognition tasks by an image recognition unit, a percentage of the number of times at least one preceding vehicle, which is running in front of an own vehicle, is recognized by the pair of the first and second target recognition tasks to the number of times the at least one preceding vehicle is recognized by at least the image recognition task. The apparatus detects misalignment of the beam axis of the beam sensor in the vertical plane including the beam axis of the beam sensor in accordance with the calculated percentage.

17 Claims, 15 Drawing Sheets

(52) U.S. Cl.
CPC ..... *G01S 13/931* (2013.01); *G01S 2007/4034* (2013.01); *G01S 2013/9364* (2013.01); *G01S 2013/9367* (2013.01); *G01S 2013/9375* (2013.01)

(58) Field of Classification Search
CPC ............... G01S 13/90; G01S 2007/403; G01S 2013/9375; G01S 2007/4034; G01S 13/42; G01S 7/4972; G01S 13/354; G01S 13/426; G01S 13/583
See application file for complete search history.

(56) References Cited

U.S. PATENT DOCUMENTS

| | | | |
|---|---|---|---|
| 2007/0055446 A1* | 3/2007 | Schiffmann | G01S 7/4026 701/301 |
| 2010/0057293 A1 | 3/2010 | Hoetzer et al. | |
| 2010/0182199 A1* | 7/2010 | Jeong | G01S 7/4026 342/374 |
| 2011/0102234 A1* | 5/2011 | Adams | G01S 13/888 342/22 |
| 2011/0163904 A1* | 7/2011 | Alland | B60R 1/00 342/1 |
| 2012/0268313 A1 | 10/2012 | Shimizu et al. | |
| 2013/0015999 A1* | 1/2013 | Alland | G01S 7/4026 342/70 |
| 2014/0118179 A1* | 5/2014 | Alland | G01S 7/025 342/22 |

FOREIGN PATENT DOCUMENTS

| | | |
|---|---|---|
| JP | 2005-071204 A | 3/2005 |
| JP | 2011-002346 A | 1/2011 |

* cited by examiner

DISTANCE DETERMINATION

| [INPUT] DISTANCE [m] | [OUTPUT] DISTANCE INDEX |
|---|---|
| 0-10m | 1 |
| 10-20m | 2 |
| 20-30m | 3 |
| 30-40m | 4 |
| 40-50m | 5 |
| 50-60m | 6 |
| 60-70m | 7 |
| 70-80m | 8 |
| 80-90m | 9 |
| 90-100m | 10 |
| 100m- | 11 |

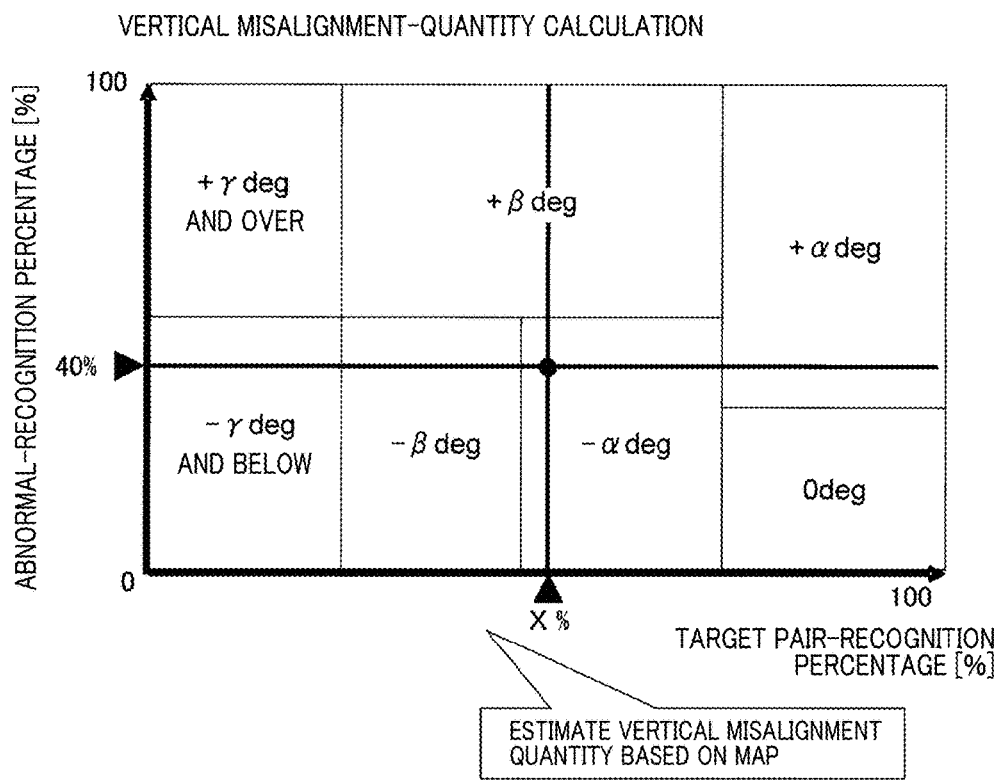

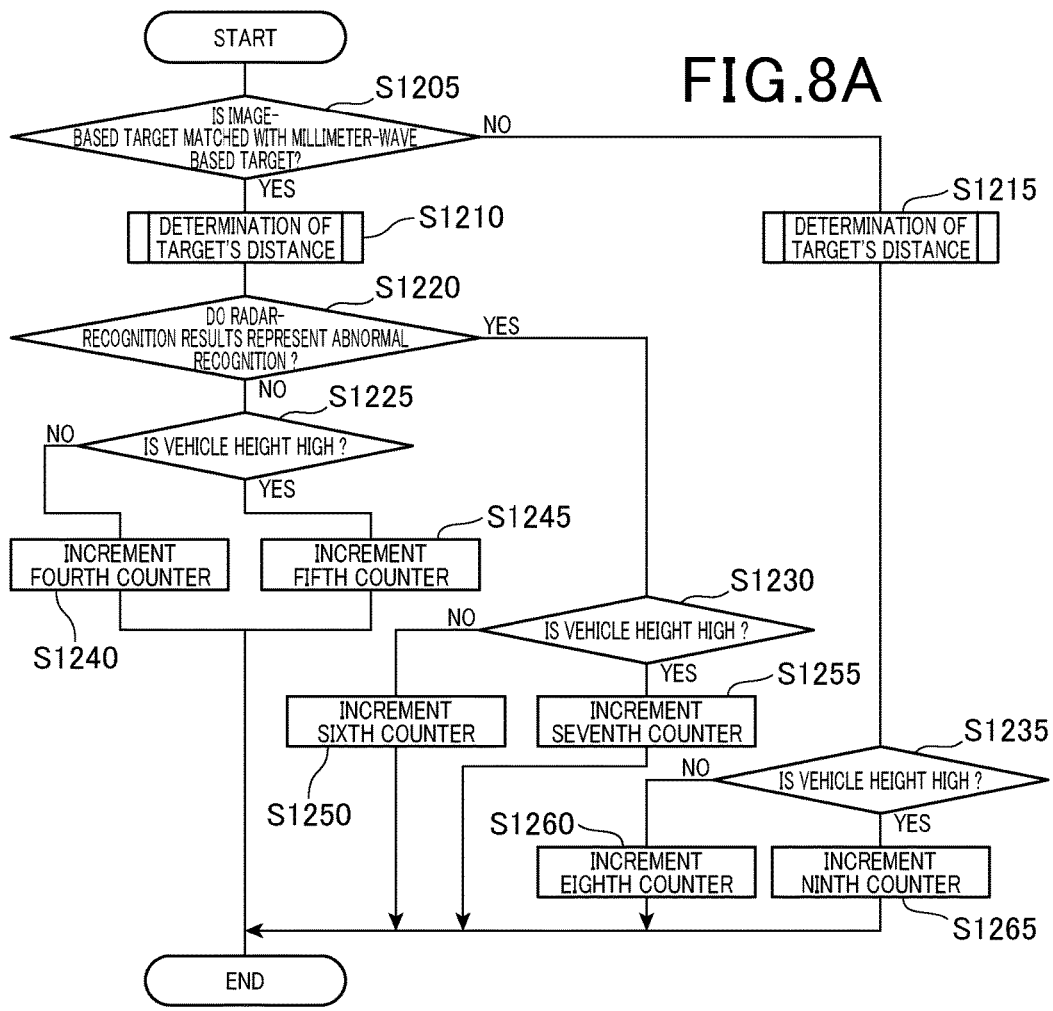

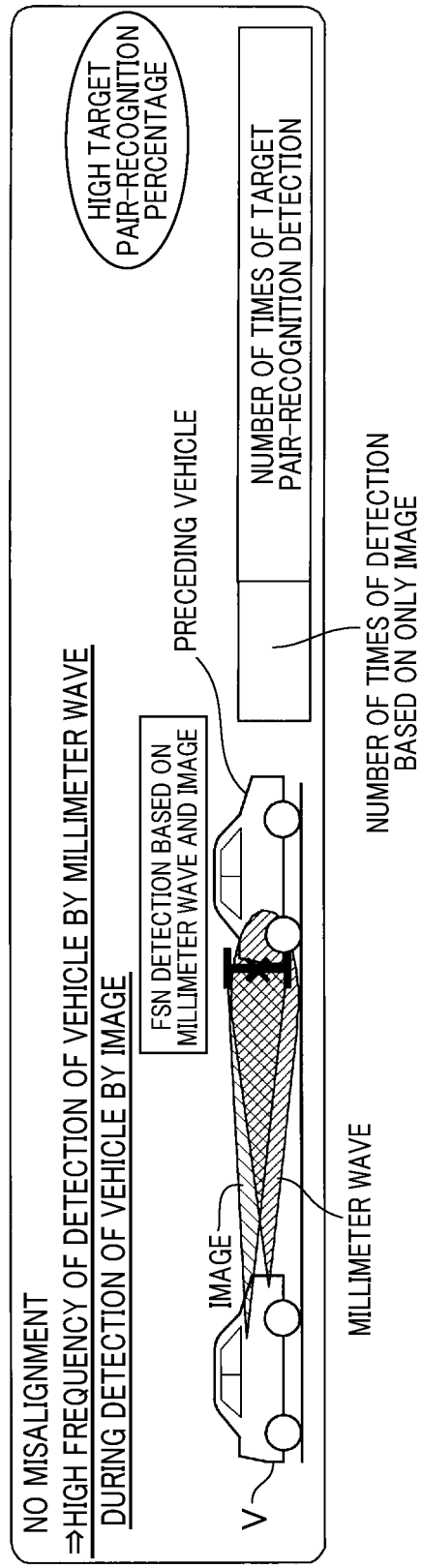

EXAMPLE: COMPARE DISTANCE BASED ON MILLIMETER WAVE
WITH DISTANCE BASED ON IMAGE TO CALCULATE DIFFERENCE
IN INCLINATION BASED ON DIFFERENCE IN DISTANCE

PRECEDING VEHICLE AT SHORT DISTANCE

CHANGE LOCATION OF WINDOW DEPENDING ON DISTANCE

PRECEDING VEHICLE AT LONG DISTANCE

CHANGE LOCATION OF WINDOW DEPENDING ON DISTANCE

APPARATUS FOR DETECTING AXIAL MISALIGNMENT OF BEAM SENSOR

TECHNICAL FIELD

The present disclosure relates to technologies for detecting axial misalignment of a beam sensor installable to vehicles. Note that the axial misalignment of a beam sensor represents displacement of a reference axis of a beam output from the beam sensor in its advancing direction with respect to a previously designed axis position; the reference axis of a beam sensor is referred to as a beam axis of the beam sensor.

BACKGROUND ART

Beam sensors are usually used in order to perform various types of control for improving the running safety of vehicles. Such a beam sensor transmits probing beams, such as laser beams, ultrasonic waves, or millimeter waves, and receives reflection beams, thus detecting targets located around a vehicle.

Such a beam sensor is mounted to a predetermined mount position of a vehicle while the beam axis is aligned with a previously designed axis position such that each probing beam is irradiated within a predetermined irradiation range. For this reason, if any factor causes the mounted position of the beam sensor to be deviated from the predetermined mount position, the beam axis may be deviated from the previously designed axis position. This may result in radar waves being out of the predetermined irradiation range. This may deteriorate the detection accuracy of targets to be detected by the beam sensor, deteriorating the accuracy of the various types of control for improving the running safety of the vehicle.

In view of these circumstances, technologies are proposed for detecting axial misalignment of beam sensors.

For example, a technology disclosed in patent document 1 detects a stationary object, which is located at one side of the travelling direction of a vehicle and extends in the travelling direction, and detects, based on captured images, that there are no other objects adjacent to the stationary object. Then, the technology transmits a radar signal at the detecting operation, and determines whether the difference between the distribution direction of each reflection point of the radar signal by the stationary object and a reference direction is equal to or more than a threshold value. The technology determines, based on the results of the determination, whether there is axial misalignment of the radar beam axis in a horizontal plane including the radar beam axis, i.e. the plane extending along the vehicle width direction and including the radar beam axis.

Additionally, a technology disclosed in patent document 2 detects a vanishing point in accordance with an image captured while a vehicle to which a laser beam sensor is installed is running.

Then, during adjustment of the laser beam axis, i.e. while the vehicle is stopped, the technology detects, based on the detected vanishing point and the transmitting direction of a laser beam, the difference between the transmitting direction of the laser beam and the forward direction of the vehicle, and corrects the transmitting direction of the laser beam accordingly.

CITATION LIST

Patent Document

[Patent Document 1] Japanese Patent Application Publication No. 2011-2346

[Patent Document 2] Japanese Patent Application Publication No. 2004-205398

SUMMARY OF INVENTION

Technical Problem

The technology disclosed in patent document 1 detects axial misalignment in the horizontal plane including the radar beam axis. Specifically, the technology disclosed in the patent document 1 results in a difficulty in detection of axial misalignment of the radar beam axis in a vertical plane including the radar beam axis, i.e. the plane extending along the vehicle height direction and including the radar beam axis.

The technology disclosed in patent document 2 is capable of correcting the transmitting direction of the laser beam in accordance with the vanishing point that is detected based on the image captured while the vehicle to which the laser beam sensor is installed is running. Unfortunately, the technology performs the correction of the transmitting direction of the laser beam during adjustment of the laser beam axis, i.e. while the vehicle is stopped. Thus, the technology may result in a difficulty in detection of axial misalignment of the radar beam sensor while the corresponding vehicle is running.

The present disclosure has been created in view of such a problem. For example, an object of the present disclosure is to provide technologies, each of which is capable of detecting axial misalignment of a beam sensor, which is installable in a vehicle, in the vertical plane including a beam axis of the beam sensor while the vehicle is running.

Means for Solving Problem

An axial misalignment detection apparatus according to an exemplary aspect of the present disclosure includes a beam recognition unit configured to irradiate a probing beam to a front of an own vehicle via a beam sensor, and repeatedly execute a first target recognition task based on a result of receiving a reflected beam that is based on the irradiated probing beam. The apparatus includes an image recognition unit configured to repeatedly execute a second target recognition task based on a captured image in front of the own vehicle captured by an image sensor. The apparatus includes an alignment detection unit. The alignment detection unit is configured to calculate, based on a result of the first target recognition tasks and a result of the second target recognition tasks, a percentage of the number of times at least one preceding vehicle is recognized by a pair of the first and second target recognition tasks to the number of times the at least one preceding vehicle is recognized by at least the image recognition task. The alignment detection unit is configured to detect misalignment of a beam axis of the beam sensor in a vertical plane including the beam axis of the beam sensor in accordance with the calculated percentage.

Thus, it is possible to detect, with higher accuracy, the misalignment of the radar beam axis with respect to the designed beam axis position in the vertical plane including the radar beam axis even while the vehicle is running.

BRIEF DESCRIPTION OF DRAWINGS

FIG. 7A is a diagram illustrating a first map used by a vertical misalignment-quantity calculation routine included in the vertical misalignment detecting routine;

FIG. 7B is a diagram illustrating a second map used by the vertical misalignment-quantity calculation routine included in the vertical misalignment detecting routine;

FIG. 8A is a flowchart illustrating a detection count routine according to the second embodiment of the present disclosure;

FIG. 8B is a diagram illustrating a distance determination table used by the detection count routine according to the second embodiment of the present disclosure;

FIG. 10A is a diagram illustrating advantageous effects of the vertical misalignment detecting routine according to the first embodiment in cooperation with FIG. 10B;

DESCRIPTION OF EMBODIMENTS

Figure 1:
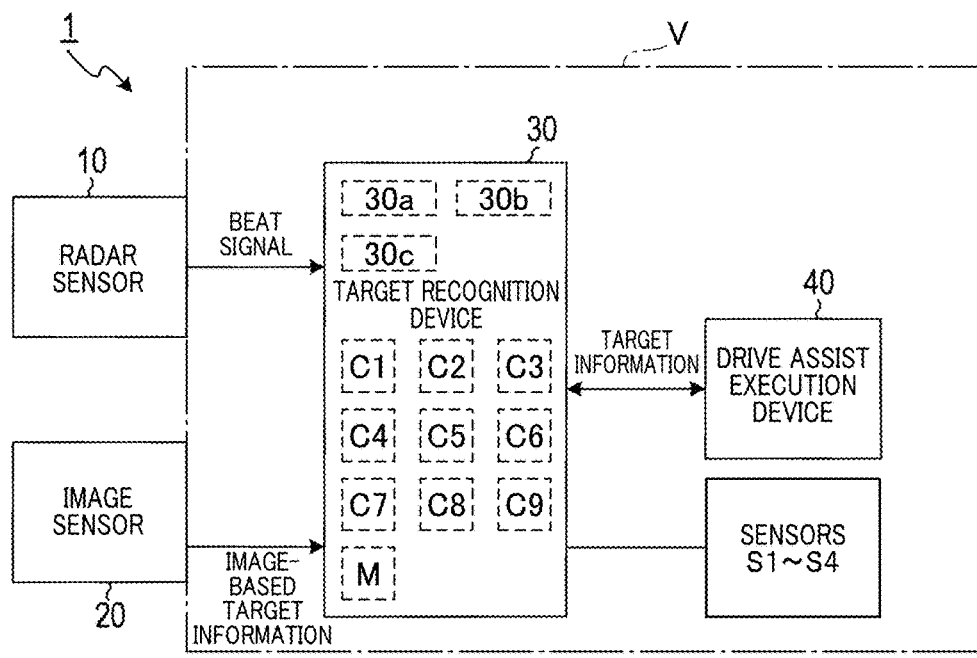
FIG. 1 is a block diagram illustrating the structure of a drive assist system according to the first embodiment of the present disclosure.

The following describes the embodiments of the present invention with reference to the accompanying drawings.

First, the following describes the first embodiment of the present disclosure.

1. Descriptions of the Structure of a Drive Assist System 1

The drive assist system 1 according to the first embodiment includes a radar sensor 10, an image sensor 20, a target recognition device 30, and a drive assist execution device 40. The drive assist system 1 is installed in a vehicle V.

The target recognition device 30 is communicably connected to the radar sensor 10, the image sensor 20, and the drive assist execution device 40. The radar sensor 10 irradiates radar waves, i.e. radar beams, toward a first probing region, i.e. a first detection range, established in front of the own vehicle, and receives echoes, i.e. reflected beams, based on the irradiated radar beams. The image sensor 20 captures images in a second probing region established in front of the own vehicle V. The target recognition device 30 recognizes various targets located in the first and second probing regions in accordance with the detection results by the radar sensor 10 and the image sensor 20. The drive assist execution device 40 controls various devices installed in the vehicle V in accordance with the recognition results by the target recognition device 30, i.e. target information, to thereby perform predetermined drive assist. The following specifically describes the structure of each component of the drive assist system 1.

1.1. Descriptions of the Structure of the Radar Sensor 10

The radar sensor 10 is designed as a known Frequency Modulated Continuous Wave (FMCW) radar mounted to the front portion of the vehicle V. The radar sensor 10 cooperates with the target recognition device 30, in particular, its normal detection task, to detect one or more targets located in the first probing region using millimeter waves.

Specifically, the radar sensor 10 is disposed to, for example, the center of the lower portion of the front head of the vehicle V. The radar sensor 10 transmits, via a transmitting antenna, a transmitting wave, i.e. a transmitting beam, whose frequency linearly rises, i.e. is modulated upward, and linearly falls, i.e. is modulated downward. The radar sensor 10 receives, via a receiving antenna, a radar wave, i.e.

a reflected beam, reflected by a target in front of the radar sensor 10. Then, the radar sensor 10 mixes the transmitting beam with the received beam to thereby extract a beat signal having a beat frequency matching with the distance R and relative velocity V between the radar sensor 10 and the target.

For example, at least one of the transmitting antenna and the receiving antenna of the radar sensor 10 is comprised of an array of antennas. Note that the combination of the transmitting antenna and the receiving antenna, at least one of which is comprised of the array of antennas will be referred to as channels. The radar sensor 10 is operative to extract a beat signal for each of the channels. The radar sensor 10 causes an AD converter to convert the extracted analog beat signal to a digital beat signal, and outputs the digital beat signal to the target recognition device 30.

1.2. Descriptions of the Structure of the Image Sensor 20

The image sensor 20 is comprised of, for example, a CCD camera disposed to, for example, the center of the upper portion of the front head of the vehicle V. The CCD camera has a second detection range, i.e. a second probing region having a predetermined angular range, i.e. view angular range, wider than that of the detection range of the radar sensor 10 (see FIG. 2A).

Figure 2A:
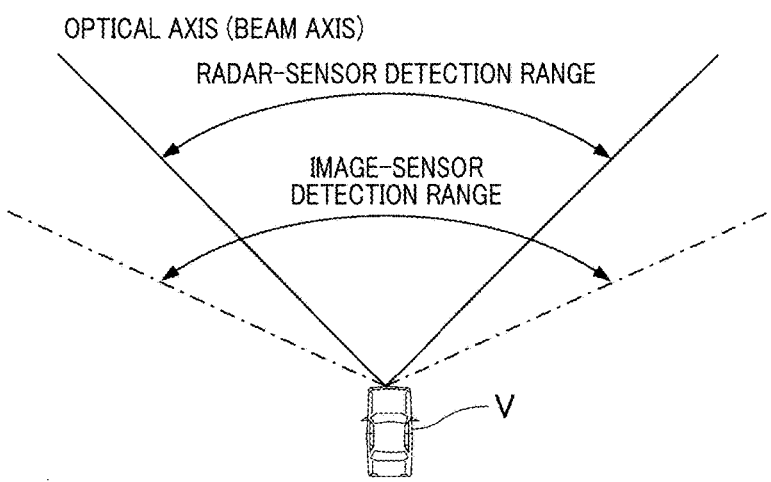
FIG. 2A is an explanatory diagram, like FIG. 2B, describing the detection ranges of respective radar sensor and image sensor illustrated in FIG. 1.

Specifically, as illustrated in FIG. 2A, the first probing range, i.e. first detection region, of the radar sensor 10 is a region expanding, in the form of a sector shape, to have a predetermined angle of view in the horizontal direction while centering on the beam axis of the radar beam. The horizontal direction, i.e. the width direction of the vehicle V, will be referred to as a vehicle width direction. Additionally, the second probing range, i.e. second detection region, of the image sensor 20 is a region expanding, in the form of a sector shape, to have a predetermined angle of view in the horizontal direction, i.e. the vehicle width direction, while centering on the optical axis of the image sensor 20. Note that, as illustrated in FIG. 2A, the beam axis of the radar sensor 10 is in agreement with the optical axis of the image sensor 20.

Figure 2B:
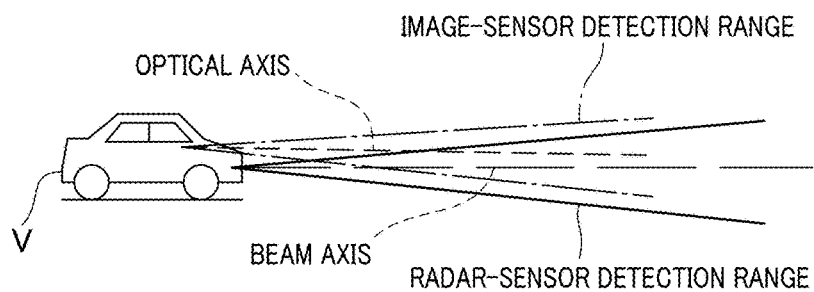
FIG. 2B is an explanatory diagram, like FIG. 2A, describing the detection ranges of the respective radar sensor and image sensor illustrated in FIG. 1.

In addition, the first probing range, i.e. first detection region, of the radar sensor 10 expands, in the form of a sector shape, to have a predetermined angle of view in the vertical direction while centering on the beam axis of the radar beam. The vertical direction, i.e. the height direction of the vehicle V, will be referred to as a vehicle height direction. Additionally, the second probing range, i.e. second detection region, of the image sensor 20 expands, in the form of a sector shape, to have a predetermined angle of view in the vertical direction, i.e. the vehicle height direction, while centering on the optical axis of the image sensor 20 (see FIG. 2B).

For example, the optical axis of the image sensor 20 is slightly inclined downward with respect to the travelling direction of the vehicle V. In contrast, the beam axis of the radar sensor 10 is substantially in parallel to the travelling direction of the vehicle V.

This results in the first probing region and the second probing region being at least partly overlap one another.

The image sensor 20 performs known image-processing tasks, such as template matching, with respect to image data captured by the CCD camera, thus detecting predetermined targets, such as vehicles or pedestrians.

The image sensor 20 also transmits, to the target recognition device 30, information indicative of at least one target, which is referred to as an image-based target, detected by the image-processing tasks as image-based target information. The image-based target information includes at least the type, size, position, such as distance and orientation, of the image-based target.

1.3. Descriptions of the Structure of the Target Recognition Device 30

The target recognition device 30 is mainly comprised of a microcomputer including, for example, a CPU, a ROM, and a RAM. The target recognition device 30 also includes a digital signal processor (DSP) for executing signal processing, such as fast Fourier transform (FFT). The target recognition device 30 includes a beam recognition unit 30a for generating, in accordance with the beat signal(s) obtained from the radar sensor 10, target information to be supplied to the drive assist execution device 40. The target recognition device 30 also includes an image recognition unit 30b for generating, in accordance with the image-based target information obtained from the image sensor 20, the target information.

Additionally, the target recognition device 30 includes an axis misalignment detector 30c that performs a vertical misalignment detecting routine. The vertical misalignment detecting routine is to detect misalignment of the radar beam axis with respect to the designed beam axis position of the radar beam axis in the vertical plane including the radar beam axis, i.e. the vertical plane including the radar beam axis along the vehicle height direction. Note that the detailed descriptions of a target recognition task are omitted in the specification, because the target recognition task is based on known technologies. The vertical misalignment detecting routine will be described later.

In other words, the target recognition device 30 serves as an apparatus for detecting axis misalignment of a beam sensor, and functionally includes a beam recognition unit, an image recognition unit, and an axis-misalignment detection unit.

1.4. Descriptions of the Structure of the Drive Assist Execution Device 40

The drive assist execution device 40 includes at least a monitor and a speaker as in-vehicle devices that the driver assist execution device 40 controls. The monitor is operative to display various images, and the speaker is operative to output audible alarms and guide messages. The drive assist execution device 40 can include various control units for controlling an internal combustion engine, a powertrain mechanism, and a brake mechanism installed in the vehicle V.

Figure 3:
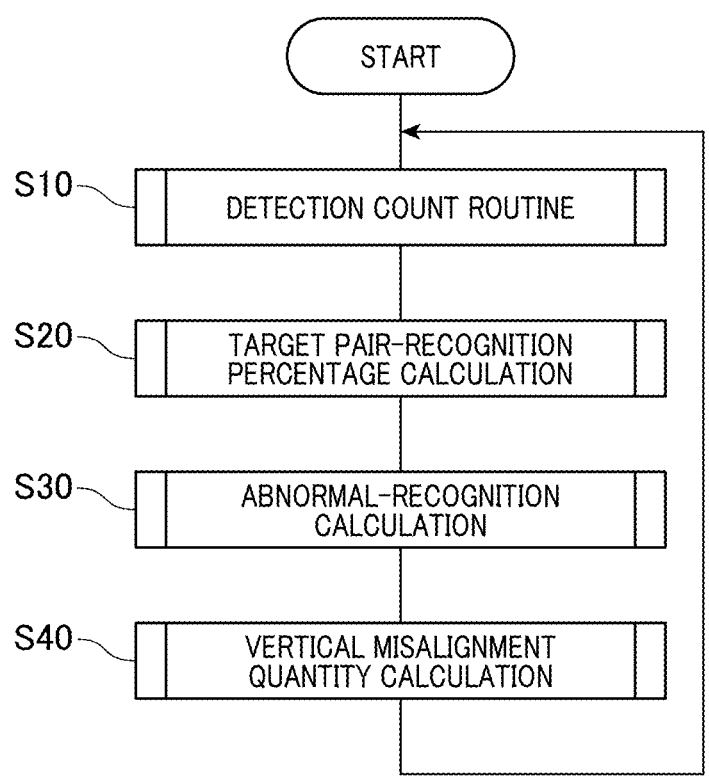
FIG. 3 is a flowchart illustrating a vertical misalignment detecting routine carried out by a target recognition device illustrated in FIG. 1.

2. Descriptions of the Structure of the Vertical Alignment Detecting Routine Next, the following describes the vertical alignment detecting routine carried out by the target recognition device 30 of the drive assist system 1 with reference to the flowchart of FIG. 3.

The target recognition device 30 starts the vertical alignment detecting routine in response to the startup of the engine of the vehicle V, and terminates the vertical alignment detecting routine in response to the stop of the engine after its startup.

First, in step S10, the target recognition device 30 executes a detection count routine as a subroutine. The detailed descriptions of the detection count routine will be described later. Thereafter, the vertical alignment detecting routine proceeds to step S20.

In step S20, the target recognition device 30 executes a target pair-recognition percentage calculation routine as a subroutine. The detailed descriptions of the target pair-recognition percentage calculation routine will be described later. Thereafter, the vertical alignment detecting routine proceeds to step S30.

In step S30, the target recognition device 30 executes an abnormal-recognition percentage calculation routine as a subroutine. The detailed descriptions of the abnormal-recognition percentage calculation routine will be described later. Thereafter, the vertical alignment detecting routine proceeds to step S40.

In step S40, the target recognition device 30 executes a vertical misalignment-quantity calculation routine as a subroutine. The detailed descriptions of the vertical misalignment-quantity calculation routine will be described later. Thereafter, the vertical alignment detecting routine returns to step S10.

2.1 Descriptions of the Detection Count Routine

Figures 4A, 4B:
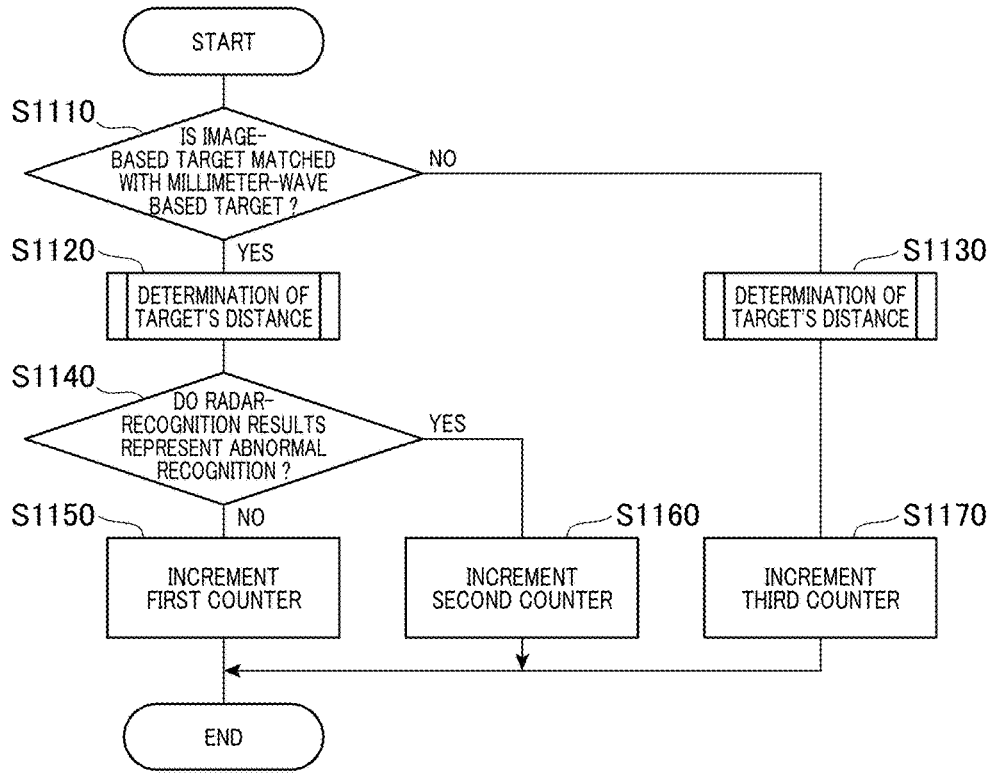
FIG. 4A is a flowchart illustrating a detection count routine in the vertical misalignment detecting routine.
FIG. 4B is a diagram illustrating a distance determination table used by the detection count routine.

Next, the following describes the detection count routine as the subroutine of step S10 in the vertical misalignment detecting routine with reference to the flowchart of FIG. 4A.

This detection count routine is carried out each time the vertical misalignment detecting routine proceeds to step S10.

First, in step S1110, the target recognition device 30 determines whether an image-based target matches with a millimeter-wave based target. Note that, in step S1110, the image-based target is a preceding vehicle recognized by the image sensor 20, and the millimeter-wave based target is a preceding vehicle recognized by the radar sensor 10. The matching of the image-based target and millimeter-wave based target means that the same target is recognized by the pair of the radar sensor 10 and the image sensor 20. This recognition therefore means pair recognition. That is, the target recognition device 30 determines whether the same preceding vehicle is recognized by the pair of the radar sensor 10 and the image sensor 20.

For example, the target recognition device 30 determines whether identification information included in the millimeter-wave based target obtained based on the radar recognition results of the radar sensor 10 matches with identification information included in the image-based target obtained based on the image recognition results of the image sensor 20. The outer-appearance information of the millimeter-wave based target is an example of the identification information of the millimeter-wave based target, and the outer-appearance information of the image-based target is an example of the identification information of the image-based target.

If the identification information included in the millimeter-wave based target matches with the identification information included in the image-based target as a result of the determination, the target recognition device 30 determines that the same target, i.e. the same preceding vehicle, is recognized by the pair of the radar sensor 10 and the image sensor 20.

That is, if the determination in step S1110 is affirmative (YES in step S1110), the detection count routine proceeds to step S1120. Otherwise, if the determination in step S1110 is negative (NO in step S1110), the detection count routine proceeds to step S1130.

In step S1120, the target recognition device 30 executes the determination of the target's distance. Specifically, the target recognition device 30 determines the distance between the own vehicle V and the preceding vehicle based on both the radar recognition and the image recognition. Note that one of the results of the radar recognition and the results of the image recognition can be used to execute the determination of the target's distance. Thereafter, the detection count routine proceeds to step S1140.

In step S1130, the target recognition device 30 executes the determination of the target's distance. Specifically, the target recognition device 30 determines the distance between the own vehicle V and the preceding vehicle based on the image recognition. Note that the results of the image recognition are used to execute the determination of the target's distance. Thereafter, the detection count routine proceeds to step S1170.

In step S1140, the target recognition device 30 determines whether the radar-recognition results represent abnormal recognition. Specifically, the target recognition device 30 determines whether the radar-recognition results by the radar sensor 10 represent abnormal recognition results.

When it is determined that the radar-recognition results represent abnormal recognition results (YES in step S1140), the detection count routine proceeds to step S1160. Otherwise, when it is determined that the radar-recognition results represent normal recognition results (NO in step S1140), the detection count routine proceeds to step S1150.

Note that the abnormal recognition results according to the first embodiment mean results different from normal recognition results. For example, the abnormal recognition results include 1. A case where the resolution of the radar-recognition results is inferior to a predetermined resolution of normal radar-recognition results 2. A case where, while the same target is continuously, i.e. cyclically, detected, disturbance causes the same target to not be detected in a cycle.

In step S1150, the target recognition device 30 increments one of hardware or software first counters C1 prepared therein.

Specifically, the target recognition device 30 refers to a distance determination table prepared therein and illustrated in FIG. 4B, and recognizes one of the first counters C1, which matches with the distance between the own vehicle V and the preceding vehicle determined in step S1120. That is, each of the first counters C1 is used to represent the number of times preceding vehicles are normally recognized by radar recognition, and the first counters C1 are prepared for the respective distance sections determined in the distance determination table. Referring to FIG. 4B, the distance determination table includes the distance sections with regular 10 m intervals from 0 to 100 m, and the single distance section for not less than 100 m. Indexes [1] to [11] are assigned to the respective distance sections. Any intervals other than 10 m intervals can be used for the distance determination table, and another number of the distance sections can be used for the distance determination table.

After the operation in step S1150, the target recognition device 30 terminates the detection count routine.

In step S1160, the target recognition device 30 increments one of hardware or software second counters C2 prepared therein.

Specifically, the target recognition device 30 refers to the distance determination table prepared therein and illustrated in FIG. 4B, and recognizes one of the second counters C2, which matches with the distance between the own vehicle V and the preceding vehicle determined in step S1120. That is, each of the second counters C2 is used to represent the number of times preceding vehicles are abnormally recognized by radar recognition, and the second counters C2 are prepared for the respective distance sections determined in the distance determination table. After the operation in step S1160, the target recognition device 30 terminates the detection count routine.

In step S1170, the target recognition device 30 increments one of hardware or software third counters C3 prepared therein.

Specifically, the target recognition device 30 refers to the distance determination table prepared therein and illustrated in FIG. 4B, and recognizes one of the third counters C3, which matches with the distance between the own vehicle V and the preceding vehicle determined in step S1120. That is, each of the third counters C3 is used to represent the number of times preceding vehicles are recognized by only image recognition without being recognized by radar recognition. The third counters C3 are prepared for the respective distance sections determined in the distance determination table. After the operation in step S1170, the target recognition device 30 terminates the detection count routine.

2.2 Descriptions of the Target Pair Recognition Percentage Calculation Routine Next, the following describes the target pair-recognition percentage calculation routine as the subroutine in the vertical misalignment detecting routine with reference to FIG. 5.

The target recognition device 30 executes the target pair-recognition percentage calculation routine each time the vertical misalignment detecting routine proceeds to step S20.

Figure 5A:
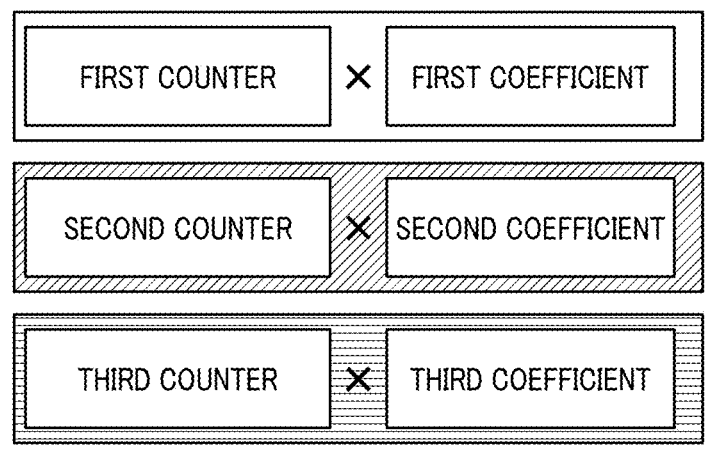
FIG. 5A is an explanatory diagram illustrating an abnormal-recognition percentage calculation routine included in the vertical misalignment detecting routine, and equations used by the abnormal-recognition percentage calculation routine.
Figure 5B:
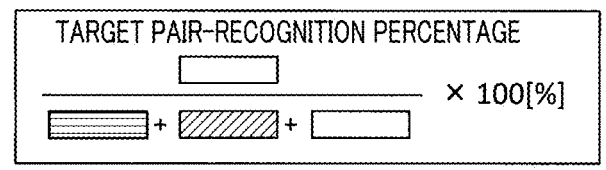
FIG. 5B is a diagram illustrating a specific solution of the first percentage calculation routine.
Figure 5C:
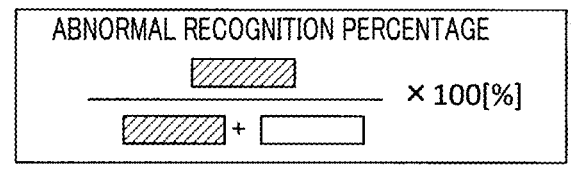
FIG. 5C is a diagram illustrating a specific solution of the second percentage calculation routine.

First, the target recognition device 30 multiplies the value of each first counter C1 by a corresponding first coefficient, multiplies the value of each second counter C2 by a corresponding second coefficient, and multiplies the value of each third counter C1 by a corresponding third coefficient (see FIG. 5A).

Note that the first, second, and third coefficients are previously established based on, for example, experiments for assigning weights to the values of the respective first, second, and third counters.

The following describes an example of how to establish the first to third coefficients using a graph indicative of the relationship between the distance from the own vehicle V to a preceding vehicle and the target pair-recognition percentage described later as for example illustrated in FIG. 6A.

The graph shows that, in a region in which the distance from the own vehicle V to the preceding vehicle is relatively short, each of values of the target pair-recognition percentage described in detail later, if there is no axial misalignment in the radar sensor, has a small difference from a corresponding one of the values of the target pair-recognition percentage if there is axial misalignment in the radar sensor 10.

In contrast, the graph shows that, in a region in which the distance from the own vehicle V to the preceding vehicle is relatively long, each of values of the target pair-recognition percentage, if there is no axial misalignment in the radar sensor, has a large difference from a corresponding one of the values of the target pair-recognition percentage if there is axial misalignment in the radar sensor 10.

Figure 6A:
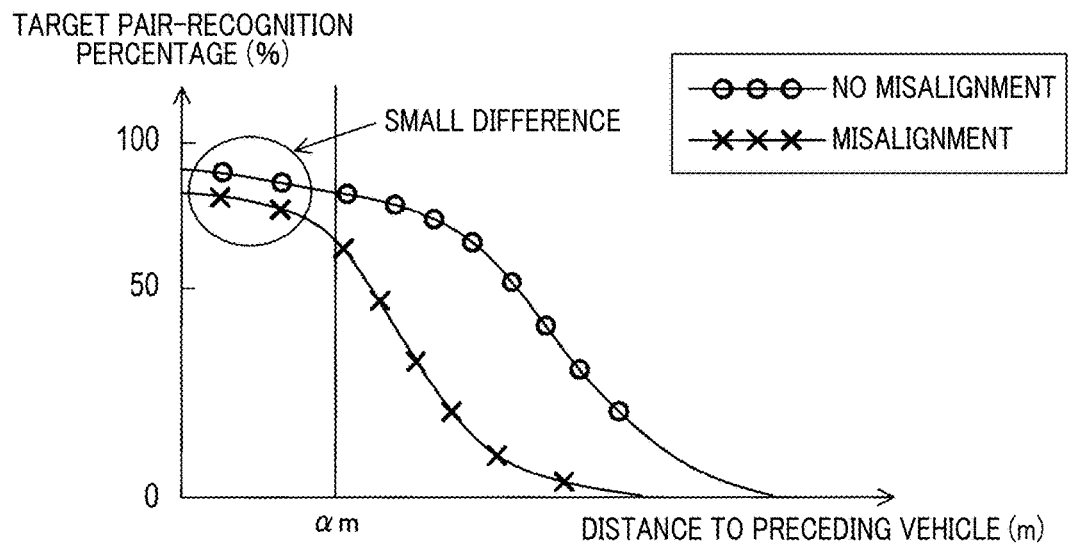
FIG. 6A is a graph illustrating the relationship between the distance from an own vehicle to a preceding vehicle and a target pair recognition percentage if no weights are assigned to all first to third counters.
Figure 6B:
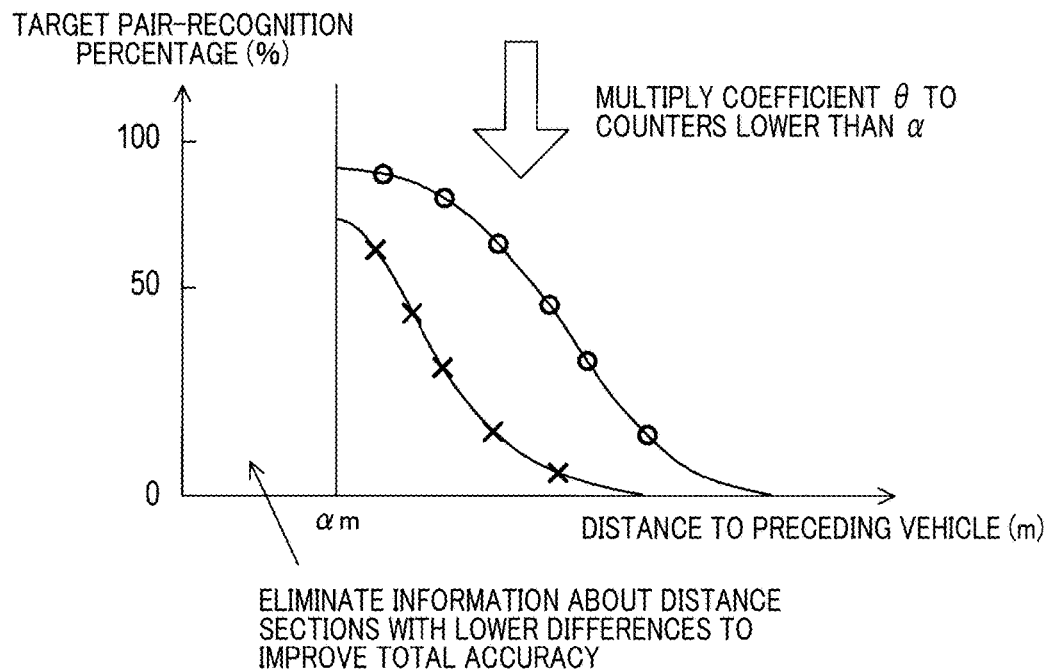
FIG. 6B is a graph illustrating the relationship between the distance from the own vehicle to the preceding vehicle and the target pair recognition percentage if a weight is assigned to at least one of the first to third counters.

For this reason, as illustrated in FIG. 6B, the coefficients are established such that weights used in the region in which the distance from the own vehicle V to the preceding vehicle is relatively short are smaller than weights used in the region in which the distance from the own vehicle V to the preceding vehicle is relatively long. In other words, the coefficients are established such that weights used in the region in which the distance from the own vehicle V to the preceding vehicle is relatively long are relatively larger than weights used in the region in which the distance from the own vehicle V to the preceding vehicle is relatively short.

In the case illustrated in FIGS. 6A and 6B, the coefficient θ of zero is configured to be multiplied by one or more counters whose corresponding distances between the vehicle V and the preceding vehicle are lower than α m. This eliminates information about predetermined distance sections with lower differences, thus improving the total accuracy (see FIG. 6B).

Subsequently, the target recognition device 30 calculates the target pair-recognition percentage. Specifically, for each distance section of the distance determination table, the target recognition device 30 divides the weighted value of the first counter C1 by the sum of the weighted value of the first counter C1, the weighted value of the second counter C2, and the weighted value of the third counter C3. This calculates the target pair-recognition percentage in units of % (see FIG. 5B).

Thereafter, the target recognition device 30 terminates the target pair-recognition percentage calculation routine.

2.3 Descriptions of the Abnormal-Recognition Percentage Calculation Routine

Next, the following describes the abnormal-recognition percentage calculation routine as the subroutine in the vertical misalignment detecting routine with reference to FIG. 5.

The target recognition device 30 executes the abnormal-recognition percentage calculation routine each time the vertical misalignment detecting routine proceeds to step S30.

First, the target recognition device 30 multiplies the value of each first counter C1 by the corresponding first coefficient, and multiplies the value of each second counter C2 by the corresponding second coefficient (see FIG. 5A).

Subsequently, the target recognition device 30 calculates the abnormal-recognition percentage. Specifically, for each distance section of the distance determination table, the target recognition device 30 divides the weighted value of the second counter C2 by the sum of the weighted value of the first counter C1 and the weighted value of the second counter C2. This calculates the abnormal-recognition percentage in units of % (see FIG. 5C).

Thereafter, the target recognition device 30 terminates the abnormal-recognition percentage calculation routine.

2.4 Descriptions of the Vertical Misalignment-Quantity Calculation Routine

Next, the following describes the vertical misalignment-quantity calculation routine as the subroutine in the vertical misalignment detecting routine with reference to FIG. 7.

The target recognition device 30 executes the vertical misalignment-quantity calculation routine each time the vertical misalignment detecting routine proceeds to step S40.

That is, the target recognition device 30 executes a vertical misalignment estimation task. The vertical misalignment estimation task estimates a misalignment quantity of the radar beam axis with respect to the designed beam axis position of the radar beam axis of the radar sensor 10 in the vertical plane including the radar beam axis in accordance with the target pair-recognition percentage calculated in step S20 and the abnormal-recognition percentage calculated in step S30.

Specifically, the target recognition device 30 refers to a map M stored therein, illustrated as an example in FIG. 7A, and extracts, in the map M, a region corresponding to the calculated target pair-recognition percentage and abnormal-recognition percentage. Then, the target recognition device 30 determines that the value of the vertical misalignment quantity, which is allocated to the extracted region (see FIG. 7B).

Note that, in the map M, each region and the value of the vertical misalignment quantity allocated to each region are previously established based on, for example, experiments.

For example, the target pair-recognition percentage has the following characteristics that, the higher the target pair-recognition percentage is, the lower the absolute value of the vertical misalignment quantity is. That is, the target pair-recognition percentage has the following characteristics that, the lower the target pair-recognition percentage is, the higher the absolute value of the vertical misalignment quantity is.

The abnormal-recognition percentage has the following characteristics that the vertical misalignment quantity is positive when the abnormal-recognition percentage is low, and the vertical misalignment quantity is negative when the abnormal-recognition percentage is high. Note that, in the vertical plane including the radar beam axis, the upper-side misalignment of the radar beam axis with respect to the designed beam axis position represents a positive misalignment quantity. In addition, in the vertical plane including the radar beam axis, the lower-side misalignment of the radar beam axis with respect to the designed beam axis position represents a negative misalignment quantity.

Based on the characteristics, each region and the value of the vertical misalignment quantity allocated to each region in the map M can be established.

An example illustrated in FIG. 7B represents that the value of the vertical misalignment quantity is $-\alpha$ degrees (deg) when the target pair-recognition percentage is X % and the abnormal-recognition percentage is Y %.

Thereafter, the target recognition device 30 terminates the vertical misalignment-quantity calculation routine.

3. Advantageous Effect of the First Embodiment

As described above, the target recognition device 30 in the drive assist system 1 according to the first embodiment performs radar recognition of at least one preceding vehicle running in front of the own vehicle V. Additionally, the target recognition device 30 performs image recognition of preceding vehicles running in front of the own vehicle V based on a captured image of a front scene of the own vehicle V.

Figure 10B:
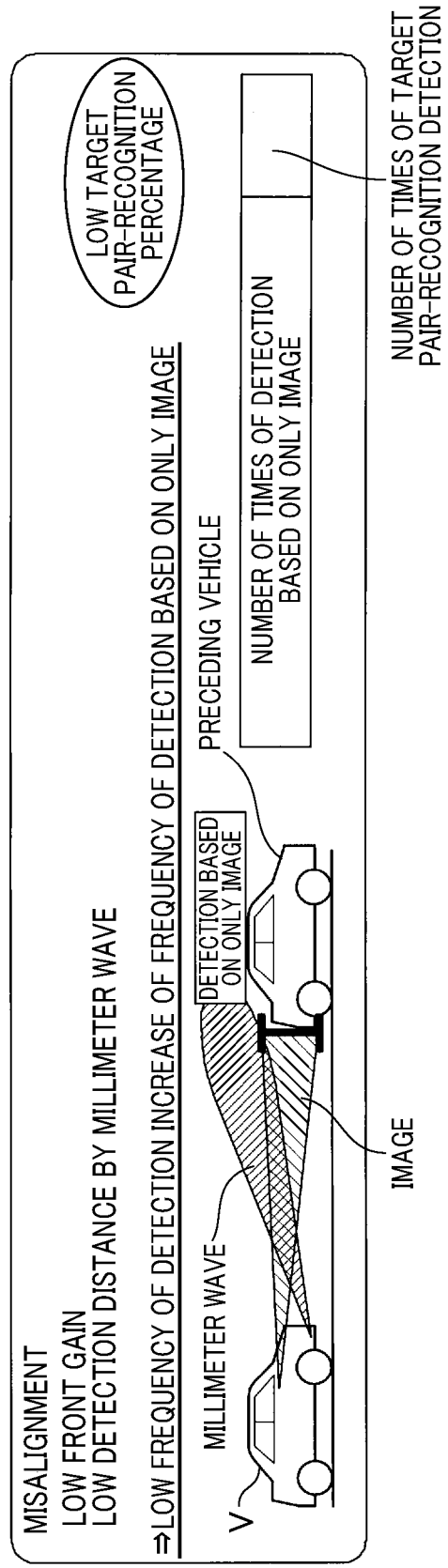
FIG. 10B is a diagram illustrating the advantageous effects of the vertical misalignment detecting routine according to the first embodiment in cooperation with FIG. 10A.

Then, the target recognition device 30 calculates, based on the radar-recognition results and the image-recognition results, the percentage of the number of times at least one preceding vehicle is recognized by the pair of the radar recognition and the image recognition to the number of times preceding vehicles are recognized by at least the image recognition. Note that an example of the percentage is the pair-recognition percentage. The target recognition device 30 detects, based on the calculated value of the percentage, the misalignment of the radar beam axis with respect to the designed beam axis position in the vertical plane including the radar beam axis (FIGS. 10A and 10B).

This makes it possible to detect, with higher accuracy, the misalignment of the radar beam axis with respect to the designed beam axis position in the vertical plane including the radar beam axis even while the vehicle V is running.

4. Other Embodiments

The first embodiment of the present invention has been described, but the present disclosure is not limited to the first embodiment, and therefore, the present disclosure can be implemented as the following embodiments.

The radar sensor 10 according to the first embodiment is configured to detect targets located in the predetermined scanning region using a millimeter beam as a scanning beam, but can be configured to detect targets located in the predetermined probing region using a laser beam or an ultrasonic beam as a probing beam.

The target recognition device 30 according to the first embodiment can be configured to detect the misalignment of the radar beam axis with respect to the designed beam axis position in the vertical plane including the radar beam axis depending on the height of the preceding vehicle.

That is, the higher the preceding vehicle is, the less the effect of misalignment in the vertical plane including the radar axis of the radar sensor 10 is. For this reason, it is aimed at eliminating, during the vertical misalignment detecting routine, preceding vehicles each having a greater height as targets used for determining misalignment of the radar beam axis in the vertical direction.

Specifically, the target recognition device 30 executes a detection count routine illustrated in FIG. 8 according to the second embodiment each time the vertical misalignment detecting routine proceeds to the detection count routine in step S10. The target recognition device 30 also executes a target pair-recognition percentage calculation routine illustrated in FIG. 9 according to the second embodiment each time the vertical misalignment detecting routine proceeds to the target pair-recognition percentage calculation routine in step S20.

In addition, the target recognition device 30 executes an abnormal-recognition percentage calculation routine illustrated in FIG. 9 according to the second embodiment each time the vertical misalignment detecting routine proceeds to the abnormal-recognition percentage calculation routine in step S30. Note that the vertical misalignment-quantity calculation routine carried out each time the vertical misalignment detecting routine proceeds to the misalignment-quantity calculation routine in step S40 is identical to the misalignment-quantity calculation routine according to the first embodiment.

Next, the following sequentially describes the detection count routine, the target pair-recognition percentage calculation routine, and the abnormal-recognition calculation routine according to the second embodiment. In addition, the following describes the advantageous effects achieved by the vertical misalignment detecting routine according to the second embodiment.

2-1 Descriptions of the Detection Count Routine (See FIG. 8)

Next, the following describes the detection count routine according to the second embodiment as the subroutine of step S10 in the vertical misalignment detecting routine.

First, in step S1205, like step S1110, the target recognition device determines whether an image-based target matches with a millimeter-wave based target. That is, the target recognition device 30 determines whether the same preceding vehicle is recognized by the pair of the radar sensor 10 and the image sensor 20.

If the determination in step S1205 is affirmative (YES in step S1205), the detection count routine proceeds to step S1210. Otherwise, if the determination in step S1205 is negative (NO in step S1205), the detection count routine proceeds to step S215.

In step S1210, like step S1120, the target recognition device 30 executes the determination of the target's distance. Specifically, the target recognition device 30 determines the distance between the own vehicle V and the preceding vehicle based on both the radar recognition and the image recognition. Note that one of the results of the radar recognition and the results of the image recognition can be used to execute the determination of the target's distance. Thereafter, the detection count routine proceeds to step S1220.

In step S1215, like step S1130, the target recognition device 30 executes the determination of the target's distance. Specifically, the target recognition device 30 determines the distance between the own vehicle V and the preceding vehicle based on the image recognition. Note that the results of the image recognition are used to execute the determination of the target's distance. Thereafter, the detection count routine proceeds to step S1235.

In step S1220, like step S1140, the target recognition device 30 determines whether the radar-recognition results represent abnormal recognition. Specifically, the target recognition device 30 determines whether the radar-recognition results by the radar sensor 10 represent abnormal recognition results.

When it is determined that the radar-recognition results represent the abnormal recognition results (YES in step S1220), the detection count routine proceeds to step S1230. Otherwise, when it is determined that the radar-recognition results represent normal recognition results (NO in step S1220), the detection count routine proceeds to step S1225.

Figure 10C:
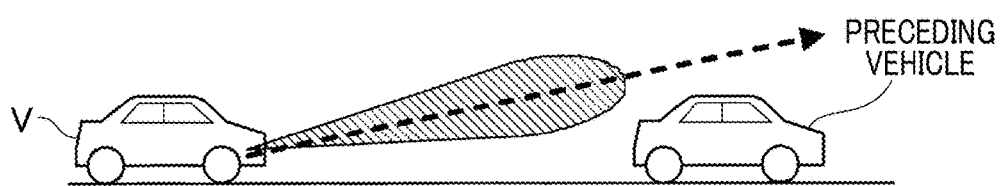
FIG. 10C is a diagram illustrating the detection count routine according to the second embodiment in cooperation with FIG. 10D.
Figure 10D:
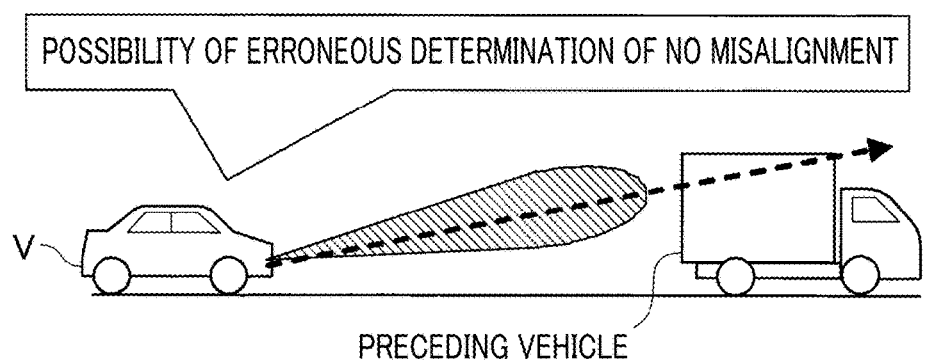
FIG. 10D is a diagram illustrating the detection count routine according to the second embodiment in cooperation with FIG. 10C.

In step S1225, the target recognition device 30 determines whether the vehicle height of the preceding vehicle is higher than the vehicle heights of standard vehicles. Specifically, the target recognition device 30 determines whether the vehicle height of the preceding vehicle is higher than a predetermined threshold in accordance with the results of the image recognition. Note that the predetermined threshold is previously set based on, for example, experiments in order to remove preceding vehicles, such as trucks, whose vehicle heights are higher than the vehicle heights of standard vehicles (see FIGS. 10C and 10D).

If the determination in step S1225 is affirmative (YES in step S1225), the detection count routine proceeds to step S1245. Otherwise, if the determination in step S1225 is negative (NO in step S1225), the detection count routine proceeds to step S1240.

In step S1230, like step S1225, the target recognition device 30 determines whether the vehicle height of the preceding vehicle is higher than the vehicle heights of standard vehicles. Specifically, the target recognition device 30 determines whether the vehicle height of the preceding vehicle is higher than the predetermined threshold in accordance with the results of the image recognition.

If the determination in step S1230 is affirmative (YES in step S1230), the detection count routine proceeds to step S1255. Otherwise, if the determination in step S1230 is negative (NO in step S1230), the detection count routine proceeds to step S1250.

In step S1240, the target recognition device 30 increments one of hardware or software fourth counters C4 prepared therein.

Specifically, the target recognition device 30 refers to a distance determination table prepared therein and illustrated in FIG. 8B, and recognizes one of the fourth counters C4, which matches with the distance between the own vehicle V and the preceding vehicle determined in step S1210. The information stored in the distance determination table is set to be identical to the information stored in the distance determination table illustrated in FIG. 4B, but can be set to be different the information stored in the distance determination table illustrated in FIG. 4B.

That is, each of the fourth counters C4 is used to represent the number of times preceding vehicles whose heights are lower than the predetermined threshold are normally recognized by radar recognition, and the fourth counters C4 are prepared for the respective distance sections determined in the distance determination table.

After the operation in step S1240, the target recognition device 30 terminates the detection count routine.

In step S1245, the target recognition device 30 increments one of hardware or software fifth counters C5 prepared therein.

Specifically, the target recognition device 30 refers to the distance determination table prepared therein and illustrated in FIG. 8B, and recognizes one of the fifth counters C5, which matches with the distance between the own vehicle V and the preceding vehicle determined in step S1210. That is, each of the fifth counters C5 is used to represent the number of times preceding vehicles whose heights are equal to or higher than the predetermined threshold are normally recognized by radar recognition, and the fifth counters C5 are prepared for the respective distance sections determined in the distance determination table.

After the operation in step S1245, the target recognition device 30 terminates the detection count routine.

In step S1250, the target recognition device 30 increments one of hardware or software sixth counters C6 prepared therein.

Specifically, the target recognition device 30 refers to the distance determination table prepared therein and illustrated in FIG. 8B, and recognizes one of the sixth counters C6, which matches with the distance between the own vehicle V and the preceding vehicle determined in step S1210. That is, each of the sixth counters C6 is used to represent the number of times preceding vehicles whose heights are lower than the predetermined threshold are abnormally recognized by radar recognition, and the sixth counters C6 are prepared for the respective distance sections determined in the distance determination table.

After the operation in step S1250, the target recognition device 30 terminates the detection count routine.

In step S1255, the target recognition device 30 increments one of hardware or software seventh counters C7 prepared therein.

Specifically, the target recognition device 30 refers to the distance determination table prepared therein and illustrated in FIG. 8B, and recognizes one of the seventh counters C7, which matches with the distance between the own vehicle V and the preceding vehicle determined in step S1210. That is, each of the seventh counters C7 is used to represent the number of times preceding vehicles whose heights are equal to or higher than the predetermined threshold are abnormally recognized by radar recognition, and the seventh counters C7 are prepared for the respective distance sections determined in the distance determination table.

After the operation in step S1255, the target recognition device 30 terminates the detection count routine.

In step S1260, the target recognition device 30 increments one of hardware or software eighth counters C8 prepared therein.

Specifically, the target recognition device 30 refers to the distance determination table prepared therein and illustrated in FIG. 8B, and recognizes one of the eighth counters C8, which matches with the distance between the own vehicle V and the preceding vehicle determined in step S1215. That is, each of the eighth counters C8 is used to represent the number of times preceding vehicles whose heights are lower than the predetermined threshold are recognized by only image recognition without being recognized by radar recognition. The eighth counters C8 are prepared for the respective distance sections determined in the distance determination table. After the operation in step S1260, the target recognition device 30 terminates the detection count routine.

In step S1265, the target recognition device 30 increments one of hardware or software ninth counters C9 prepared therein.

Specifically, the target recognition device 30 refers to the distance determination table prepared therein and illustrated in FIG. 8B, and recognizes one of the ninth counters C9, which matches with the distance between the own vehicle V and the preceding vehicle determined in step S1215. That is, each of the ninth counters C9 is used to represent the number of times preceding vehicles whose heights are equal to or higher than the predetermined threshold are recognized by only image recognition without being recognized by radar recognition. The ninth counters C9 are prepared for the respective distance sections determined in the distance determination table. After the operation in step S1265, the target recognition device 30 terminates the detection count routine.

Figure 11:
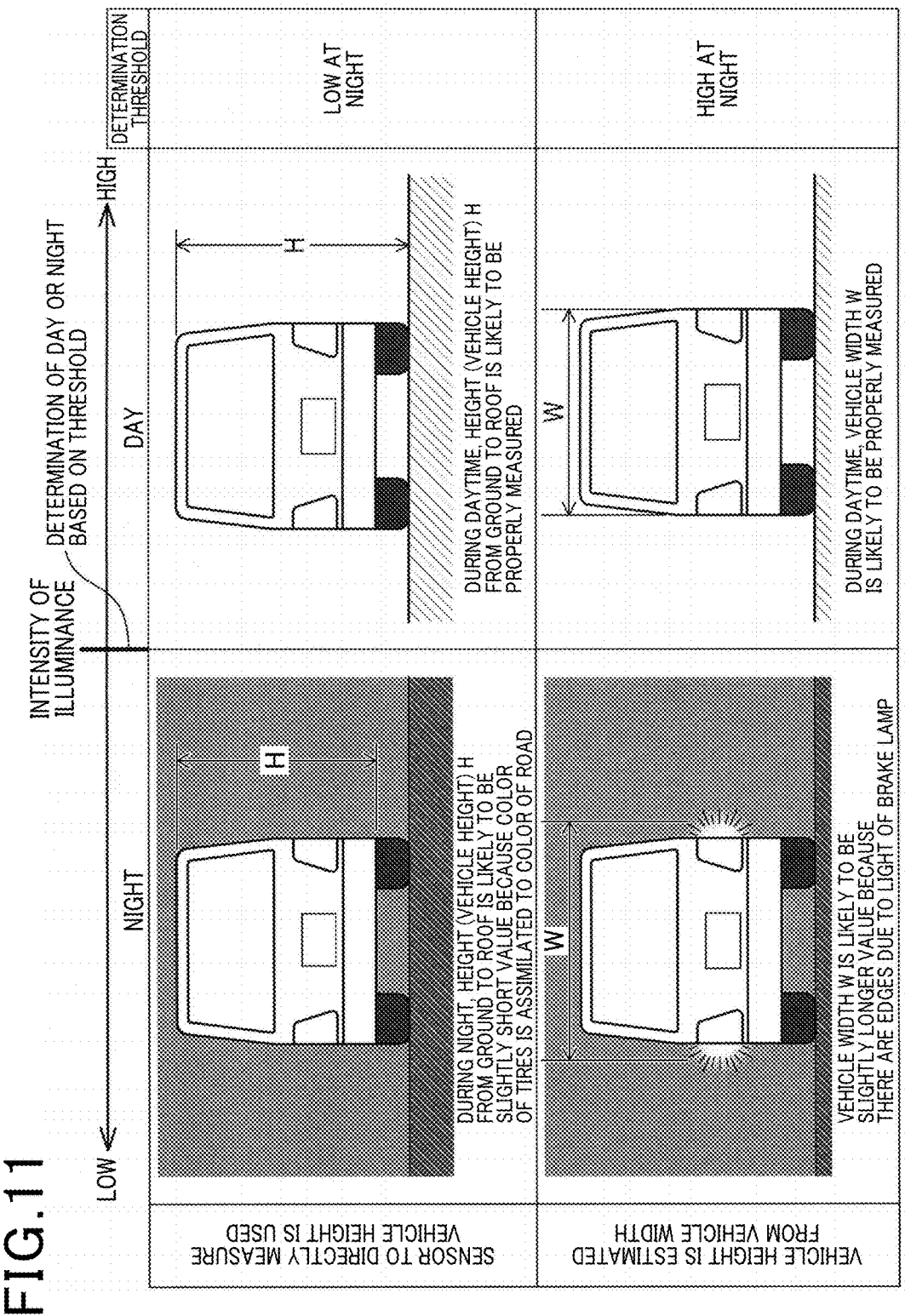
FIG. 11 is a diagram illustrating a modification of the detection count routine according to the second embodiment.

The predetermined threshold used in each of steps S1225, S1230, and S1235 can be set to be variable depending on whether there is day or night. The following describes this point with reference to FIG. 11.

Specifically, the target recognition device 30 determines whether it is day or night in accordance with the intensity of illuminance around the own vehicle V. For example, the target recognition device 30 uses an illuminance sensor S1 (see FIG. 1) to measure the intensity of illuminance around the own vehicle V. Then, the target recognition device 30 determines that it is day when determining that the measured intensity of illuminance is equal to or higher than a predetermined intensity of illuminance. Otherwise, the target recognition device 30 determines that it is night when determining that the measured intensity of illuminance is lower than the predetermined intensity of illuminance.

At that time, let us assume that the target recognition device 30 uses a vehicle height sensor S2 (see FIG. 1) for directly measuring the vehicle height of the preceding vehicle. In this assumption, when it is determined that it is day as set forth above, the target recognition device 30 sets the predetermined determination threshold for determining the vehicle height of the preceding vehicle to a normal reference value. Otherwise, in this assumption, when it is determined that it is night as set forth above, the target recognition device 30 sets the predetermined determination threshold to be lower than the normal reference value for the determination of day. Specifically, the height of the ground to the roof of the preceding vehicle, i.e. the vehicle height (see reference character H in FIG. 11), is likely to be properly measured when it is day. On the other hand, the vehicle height of the preceding vehicle is likely to be measured as a value slightly shorter than the vehicle height of the preceding vehicle when it is night. This is because the tires of the preceding vehicle and their surroundings are likely to be assimilated to the color of the ground due to the low value of the intensity of illuminance around the own vehicle. Thus, the target recognition device 30 executes a task to reduce the predetermined determination threshold.

At that time, let us assume that the target recognition device 30 uses a vehicle width sensor S3 to measure the vehicle width of the preceding vehicle, and estimates the vehicle height of the preceding vehicle in accordance with the measured vehicle width of the preceding vehicle. In this assumption, when it is determined that it is day as set forth above, the target recognition device 30 sets the predetermined determination threshold for determining the vehicle height of the preceding vehicle to the normal reference value. Otherwise, in this assumption, when it is determined that it is night as set forth above, the target recognition device 30 sets the predetermined determination threshold to be higher than the normal reference value for the determination of day. Specifically, the vehicle width of the preceding vehicle is likely to be properly measured when it is day. On the other hand, the vehicle width of the preceding vehicle is likely to be measured as a value slightly longer than the vehicle width of the preceding vehicle when it is night. This is because it appears that there are edges at the lateral sides of the preceding vehicle due to light of hazard lamps and/or brake lamps located at either side of the preceding vehicle. This results in the vehicle width of the preceding vehicle being likely to be measured as a value slightly longer than the actual vehicle width of the preceding vehicle. Thus, the target recognition device 30 executes a task to increase the predetermined determination threshold.

Changing the determination threshold depending on whether it is day or night enables the accuracy of determining the vehicle height of the preceding vehicle to be improved.

Figure 9A:
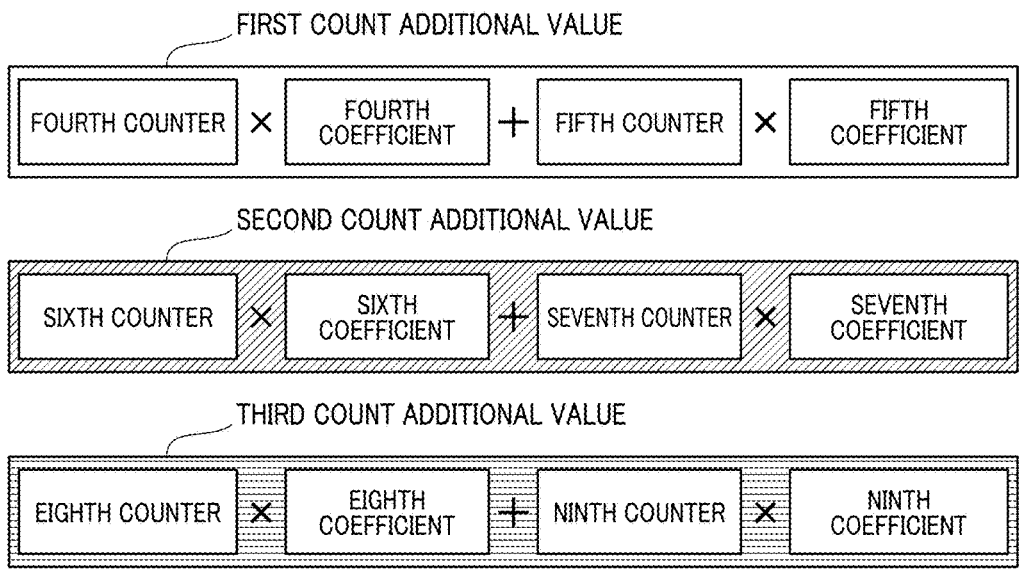
FIG. 9A is an explanatory diagram illustrating equations used by a target pair-recognition percentage calculation routine and an abnormal-recognition percentage calculation routine according to the second embodiment of the present disclosure.
Figure 9B:
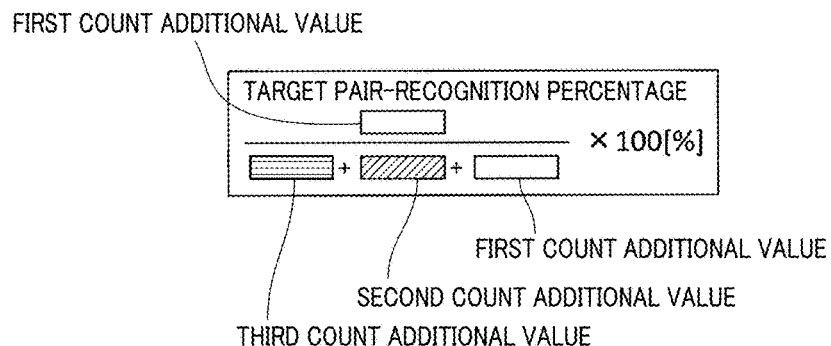
FIG. 9B is a diagram illustrating a specific solution of the target pair-recognition percentage calculation routine according to the second embodiment of the present disclosure.
Figure 9C:
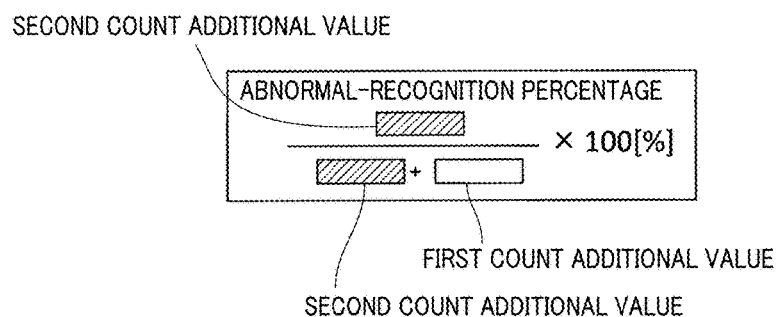
FIG. 9C is a diagram illustrating a specific solution of the abnormal-recognition percentage calculation routine.

2-2 Descriptions of the Target Pair-Recognition Percentage Calculation Routine (See FIGS. 9A to 9C)

Next, the following describes the target pair-recognition percentage calculation routine executed by the target recognition device 30 according to the second embodiment each time the vertical misalignment detecting routine proceeds to step S20.

First, the target recognition device 30 multiplies the value of each fourth counter C4 by a corresponding fourth coefficient, and multiplies the value of each fifth counter C5 by a corresponding fifth coefficient (see FIG. 9A). Then, the target recognition device 30 calculates the sum of the value of each fourth counter C4 obtained by the multiplication and the value of the corresponding fifth counter C5 obtained by the multiplication, thus calculating a first count additional value for each of the distance sections.

In addition, the target recognition device 30 multiplies the value of each sixth counter C6 by a corresponding sixth coefficient, and multiplies the value of each seventh counter C7 by a corresponding seventh coefficient (see FIG. 9A). Then, the target recognition device 30 calculates the sum of the value of each sixth counter C6 obtained by the multiplication and the value of the corresponding seventh counter C7 obtained by the multiplication, thus calculating a second count additional value for each of the distance sections.

Moreover, the target recognition device 30 multiplies the value of each eighth counter C8 by a corresponding eighth coefficient, and multiplies the value of each ninth counter C9 by a corresponding ninth coefficient (see FIG. 9A). Then, the target recognition device 30 calculates the sum of the value of each eighth counter C8 obtained by the multiplication and the value of the corresponding ninth counter C9 obtained by the multiplication, thus calculating a third count additional value for each of the distance sections.

Note that the fourth to ninth coefficients are previously established based on, for example, experiments for assigning weights to the values of the respective fourth to ninth counters.

Next, the target recognition device 30 calculates the target pair-recognition percentage. Specifically, for each distance section of the distance determination table, the target recognition device 30 divides the first count additional value by the sum of the first count additional value, the second count additional value, and the third count additional value. This calculates the target pair-recognition percentage in units of % (see FIG. 9B).

Thereafter, the target recognition device 30 terminates the target pair-recognition percentage calculation routine.

2-3 Descriptions of the Abnormal-Recognition Percentage Calculation Routine (See FIGS. 9A to 9C)

Next, the following describes the abnormal-recognition percentage calculation routine according to the second embodiment executed by the target recognition device 30 each time the vertical misalignment detecting routine proceeds to step S30.

First, the target recognition device 30 multiplies the value of each fourth counter C4 by the corresponding fourth coefficient, and multiplies the value of each fifth counter C5 by the corresponding fifth coefficient (see FIG. 9A). Then, the target recognition device 30 calculates the sum of the value of each fourth counter C4 obtained by the multiplication and the value of the corresponding fifth counter C5 obtained by the multiplication, thus calculating the first count additional value for each of the distance sections.

In addition, the target recognition device 30 multiplies the value of each sixth counter C6 by a corresponding sixth coefficient, and multiplies the value of each seventh counter C7 by the corresponding seventh coefficient (see FIG. 9A). Then, the target recognition device 30 calculates the sum of the value of each sixth counter C6 obtained by the multiplication and the value of the corresponding seventh counter C7 obtained by the multiplication, thus calculating the second count additional value for each of the distance sections.

Next, the target recognition device 30 calculates the abnormal-recognition percentage. Specifically, for each distance section of the distance determination table, the target recognition device 30 divides the first count additional value by the sum of the first and second count additional values. This calculates the abnormal-recognition percentage in units of % (see FIG. 9C).

Thereafter, the target recognition device 30 terminates the abnormal-recognition percentage calculation routine.

2-4. Advantageous Effect of the Vertical Alignment Detecting Routine According to the Second Embodiment As described above, like the vertical alignment detecting routine according to the first embodiment, the vertical alignment detecting routine according to the second embodiment makes it possible to detect the misalignment of the radar beam axis with respect to the designed beam axis position in the vertical plane including the radar beam axis even while the vehicle V is running.

Additionally, the vertical alignment detecting routine according to the second embodiment calculates the target pair-recognition percentage and the abnormal-recognition percentage depending on the vehicle height of the preceding vehicle. This makes it possible to detect, with further higher accuracy, the misalignment of the radar beam axis with respect to the designed beam axis position in the vertical plane including the radar beam axis even while the vehicle V is running.

Let us consider that the close range in which each of values of the target pair-recognition percentage if there is no axial misalignment in the radar sensor has a small difference from a corresponding one of the values of the target pair-recognition percentage if there is axial misalignment in the radar sensor 10 as illustrated in FIGS. 6A and 6B. At that time, the target recognition device 30 of each of the first and second embodiments is configured to multiply a coefficient to the value of each of the first to third counters C1 to C3 so as not to use information in the close range. The present disclosure is however not limited to this configuration.

For example, the target recognition device 30 can confirm determination of misalignment of the radar beam axis with respect to the designed beam axis position of the radar beam axis in the vertical plane including the radar beam axis in accordance with the percentage of the number of close-distance data samples to the number of the total data samples.

For example, the target recognition device 30 can confirm the determination of misalignment if the percentage of the number of close-distance data samples to the number of the total data samples is lower than a predetermined value. Otherwise, the target recognition device 30 cannot confirm the determination of misalignment if the percentage of the number of close-distance data samples to the number of the total data samples is equal to or higher than the predetermined value.

As another example, the target recognition device 30 can confirm the determination of misalignment if the percentage of the number of long-distance data samples to the number of the total data samples is equal to or higher than a predetermined value. Otherwise, the target recognition device 30 cannot confirm the determination of misalignment if the percentage of the number of long-distance data samples to the number of the total data samples is lower than the predetermined value.

The requirement of the close-distance data samples and the requirement of the long-distance data samples can be combined to each other. Specifically, the target recognition device 30 can confirm the determination of misalignment if the percentage of the number of close-distance data samples to the number of the total data samples and the percentage of the number of long-distance data samples to the number of the total data samples meet a predetermined condition. The target recognition device 30 cannot confirm the determination of misalignment if the percentage of the number of close-distance data samples to the number of the total data samples and the percentage of the number of long-distance data samples to the number of the total data samples do not meet the predetermined condition.

As described above, the target recognition device 30 is configured to cancel complete disuse of close-distance data samples, and to confirm the determination of misalignment if the percentage of the number of close-distance data samples is lower than the predetermined value. This enables time required for the determination of misalignment not to become too long.

The target recognition device 30 can determine whether to execute the vertical misalignment detecting routine in accordance with the difference between the inclination angle of the point of the road on which the own vehicle V is running and the inclination angle of the point of the road on which the preceding vehicle is running.

For example, as illustrated in FIG. 12, the target recognition device 30 calculates the difference θ between the inclination angle at the point of the road on which the own vehicle V is running and the inclination angle at the point of the road on which the preceding vehicle is running. Then, the target recognition device 30 determines, based on the calculated difference θ, whether to use the preceding vehicle as a target of the vertical misalignment detecting routine.

For example, the target recognition device 30 performs affirmative determination for using the preceding vehicle as a target of the vertical misalignment detecting routine if the calculated difference θ is lower than a predetermined threshold angle. Otherwise, the target recognition device 30 performs negative determination of using the preceding vehicle as a target of the vertical misalignment detecting routine if the calculated difference θ is equal to or higher than the predetermined threshold angle.

Specifically, the target recognition device 30 executes the vertical misalignment detecting routine if the affirmative determination is made, or does not execute the vertical misalignment detecting routine if the negative determination is made.

The target recognition device 30 can calculate the inclination angle of the point of the road on which the own vehicle V is running using the output of an inclination sensor S4 (see FIG. 1) installed in the own vehicle V.

Figure 13:
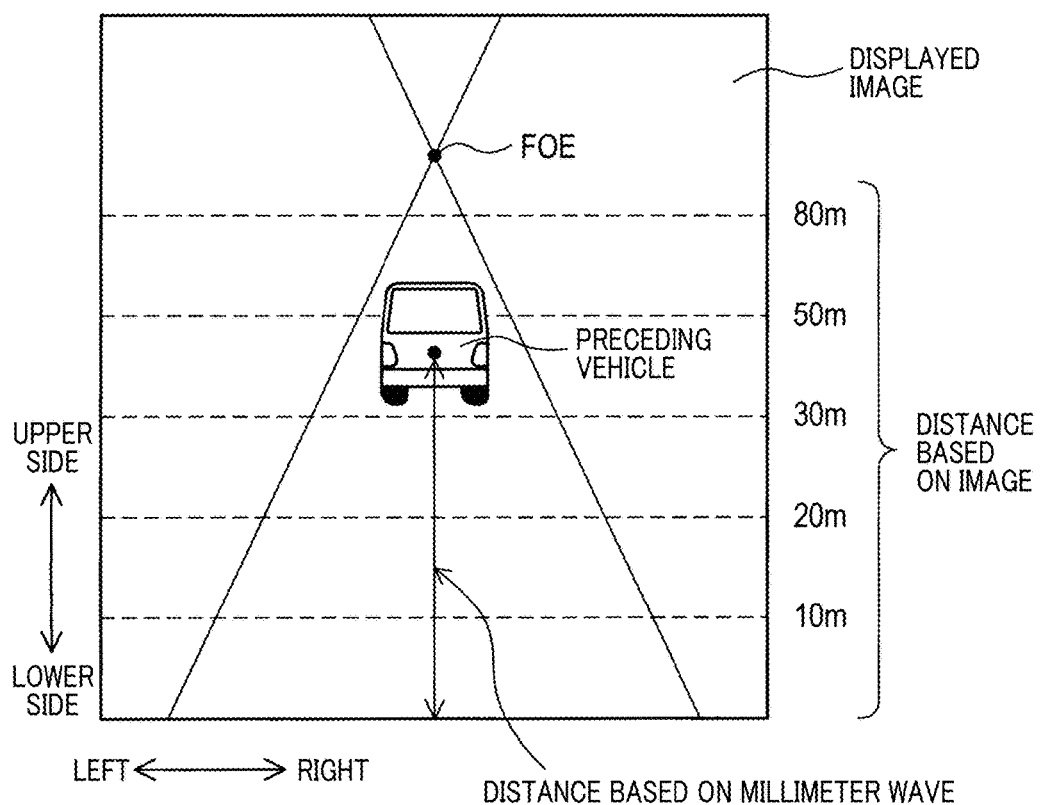
FIG. 13 is a diagram illustrating another modification of the vertical misalignment detecting routines.

As illustrated in FIG. 13, the target recognition device 30 can estimate the inclination angle at the point of the road on which the preceding vehicle is running in accordance with, for example, the focus of expansion (FOE) in the image captured by the image sensor 20, the vehicle width of the preceding vehicle, and the distance between the own vehicle V and the preceding vehicle. The target recognition device 30 can use the detection results of vertical scanning based on probing beams, such as ultrasonic waves or millimeter waves to thereby calculate the difference θ. The target recognition device 30 can use information indicative of the point of the road at which the preceding vehicle is running; the information is obtained from a locator of a navigation system installed in the vehicle V.

Figure 12A:
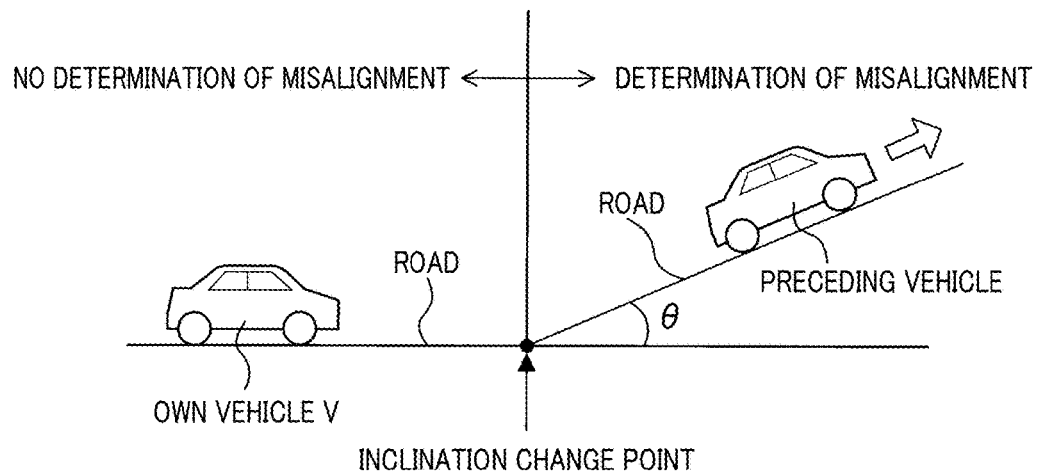
FIG. 12A is a diagram illustrating a modification of the vertical misalignment detecting routines in cooperation with FIG. 12B.

Additionally, as illustrated in FIG. 12A, if the road on which the preceding vehicle is running has an upward slope surface, i.e. the road is upward-sloping, the target recognition device 30 increases the reliability of the determination that there is no downward misalignment of the radar beam axis with respect to the designed beam axis position.

For example, the target recognition device 30 can increase the value of each first coefficient (see FIG. 5A) from 1.0 with an increase of the upward inclination angle of the road on which the preceding vehicle is running.

Figure 12B:
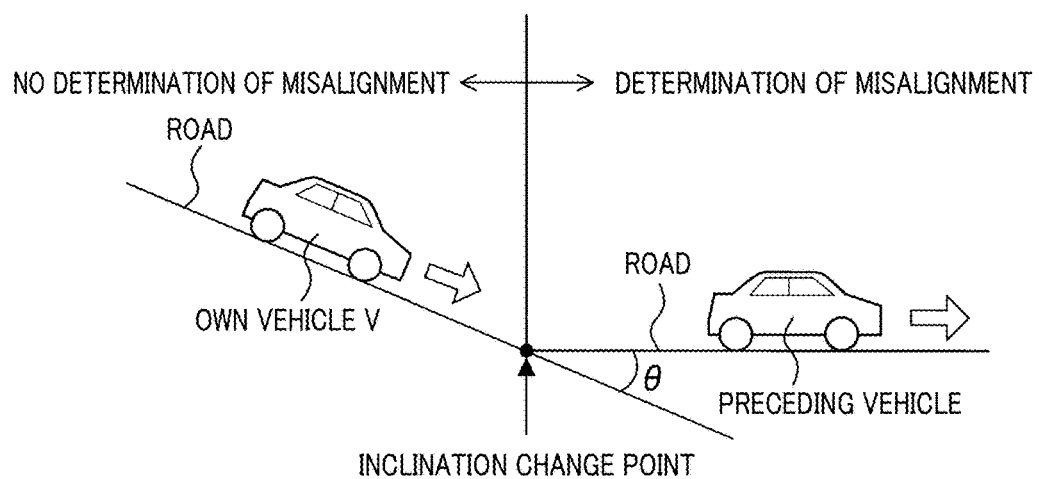
FIG. 12B is a diagram illustrating the modification of the vertical misalignment detecting routines in cooperation with FIG. 12A.

In addition, as illustrated in FIG. 12B, if the road on which the preceding vehicle is running has a downward slope surface, i.e. the road is downward-sloping, the target recognition device 30 increases the reliability of the determination that there is no upward misalignment of the radar beam axis with respect to the designed beam axis position.

For example, the target recognition device 30 can increase the value of each first coefficient (see FIG. 5A) from 1.0 with an increase of the downward inclination angle of the road on which the preceding vehicle is running.

This disables execution of the determination of misalignment under the conditions where the detection accuracy of misalignment of the radar beam axis is estimated to be deteriorated. It is also possible to detect, with higher accuracy, the misalignment of the radar beam axis with respect to the designed beam axis position in the vertical plane including the radar beam axis even while the vehicle V is running.

The target recognition device 30 can determine whether to perform the vertical misalignment detecting routine depending on an inclination change point at which the inclination angle of the point of the road at which the own vehicle V is running is changed to the inclination angle of the point of the road at which the preceding vehicle is running.

For example, as illustrated in FIGS. 12A and 12B, the target recognition device 30 calculates the inclination change point at which the inclination angle of the point of the road at which the own vehicle V is running is changed to the inclination angle of the point of the road at which the preceding vehicle is running. Then, the target recognition device 30 does not execute the vertical misalignment detecting routine until the own vehicle V passes through the calculated change point, and executes the vertical misalignment detecting routine after the own vehicle V has passed through the calculated change point.

Figure 14A:
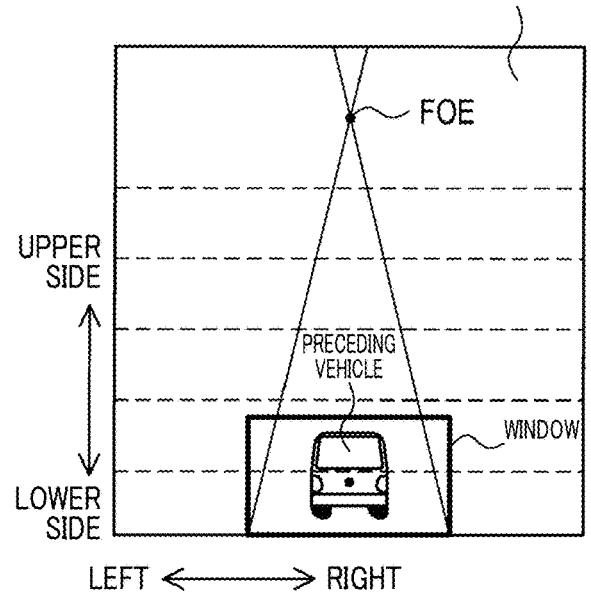
FIG. 14A is a diagram illustrating a further modification of the vertical misalignment detecting routines in cooperation with FIG. 14B.
Figure 14B:
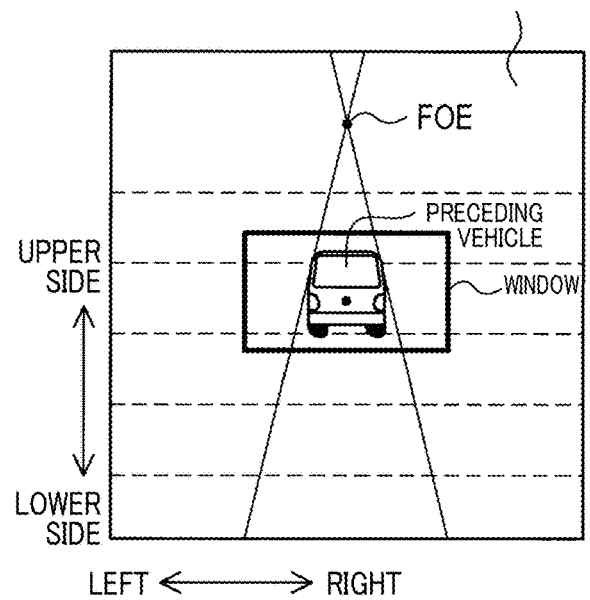
FIG. 14B is a diagram illustrating the further modification of the vertical misalignment detecting routines in cooperation with FIG. 14A.

As illustrated in FIGS. 14A and 14B, the target recognition device 30 uses a preceding vehicle in a predetermined window set in a displayed image of the image sensor 20 as a target for determination of vertical misalignment of the radar beam axis in the vertical misalignment detecting routine. For example, the target recognition device 30 can change the location of the window depending on the distance of the preceding vehicle from the own vehicle V.

For example, the target recognition device 30 sets the location of the window to a lower side of the displayed image if the distance of the preceding vehicle from the own vehicle V is shorter than a reference distance, so that the preceding vehicle is located at a close distance away from the own vehicle V. Otherwise, the target recognition device 30 sets the location of the window to an upper side of the displayed image if the distance of the preceding vehicle from the own vehicle V is longer than the reference distance, so that the preceding vehicle is located at a long distance away from the own vehicle V.

This disables execution of the determination of misalignment under the conditions where the detection accuracy of misalignment of the radar beam axis is estimated to be deteriorated. It is also possible to detect, with higher accuracy, the misalignment of the radar beam axis with respect to the designed beam axis position in the vertical plane including the radar beam axis even while the vehicle V is running.

1 Drive assist system
10 Radar sensor
20 Image sensor
30 Target recognition device
40 Drive assist execution device

The invention claimed is:

1. An apparatus for detecting axial misalignment of a beam sensor, the apparatus comprising:
   a beam recognition unit configured to irradiate a probing beam to a front of an own vehicle via a beam sensor, and repeatedly execute a first target recognition task based on a result of receiving a reflected beam that is based on the irradiated probing beam;

an image recognition unit configured to repeatedly execute a second target recognition task based on a captured image in front of the own vehicle captured by an image sensor; and an alignment detection unit configured to:
calculate, based on a result of the first target recognition tasks and a result of the second target recognition tasks, a calculated percentage of the number of times at least one preceding vehicle is recognized by a pair of the first and second target recognition tasks to the number of times the at least one preceding vehicle is recognized by the image recognition unit; and determine a relationship between values of the calculated percentage and corresponding values of misalignment of the beam sensor in a vertical plane including a beam axis of the beam sensor; and extract, from the relationship, a value of misalignment of the beam sensor in the vertical plane, the extracted value corresponding to a value of the calculated percentage, thereby detecting misalignment of the beam sensor in the vertical plane.

2. The apparatus for detecting axial misalignment according to claim 1, wherein the alignment detection unit is configured to:
determine a value of the calculated percentage for each of distance sections from the own vehicle to the at least one preceding vehicle;
assign a weight to the value of the calculated percentage for each of the calculated distance sections;
calculate a sum of the weighted values of the calculated percentage; and
detect misalignment of the beam axis of the beam sensor in the vertical plane including the beam axis of the beam sensor in accordance with the sum of the weighted values of the calculated percentage.

3. The apparatus for detecting axial misalignment according to claim 2, wherein the alignment detection unit is configured to:
repeatedly obtain a value of a height of the at least one preceding vehicle;
determine a value of the calculated percentage for each of the obtained values of the height of the at least one preceding vehicle;
calculate a sum of the determined values of the calculated percentage for the respective values of the height of the at least one preceding vehicle; and
detect misalignment of the beam axis of the beam sensor in the vertical plane including the beam axis of the beam sensor in accordance with the sum of the determined values of the calculated percentage.

4. The apparatus for detecting axial misalignment according to claim 2, wherein the at least one preceding vehicle comprises a plurality of preceding vehicles; and the alignment detection unit is configured to:
determine whether a height of one of the plurality of preceding vehicles is higher than a reference height; and
calculate, in response to determining that the height of one of the plurality of preceding vehicles is higher than the reference height, the calculated percentage for the remaining preceding vehicles without calculating the calculated percentage for the one of the plurality of preceding vehicles.

5. The apparatus for detecting axial misalignment according to claim 2, wherein, in response to the at least one preceding vehicle including a preceding vehicle normally recognized by the first target recognition task, and a preceding vehicle is abnormally recognized by the first target recognition task, the alignment detection unit is configured to:
determine a value of the calculated percentage for each of the normally recognized preceding vehicle and the abnormally recognized preceding vehicle;
detect misalignment of the beam axis of the beam sensor in the vertical plane including the beam axis of the beam sensor in accordance with the determined value of the calculated percentage for each of the normally recognized preceding vehicle and the abnormally recognized preceding vehicle;
determine whether the detected misalignment of the beam axis is upward misalignment or downward misalignment; and
obtain a quantity of the detected misalignment of the beam axis.

6. The apparatus for detecting axial misalignment according to claim 1, wherein the alignment detection unit is configured to:
determine a value of the calculated percentage for each of distance sections from the own vehicle to the at least one preceding vehicle; and
detect misalignment of the beam axis of the beam sensor in the vertical plane including the beam axis of the beam sensor in accordance with the determined value of the calculated percentage for each of the distance sections.

7. The apparatus for detecting axial misalignment according to claim 6, wherein the alignment detection unit is configured to:
repeatedly obtain a value of a height of the at least one preceding vehicle;
determine a value of the calculated percentage for each of the obtained values of the height of the at least one preceding vehicle;
calculate a sum of the determined values of the calculated percentage for the respective values of the height of the at least one preceding vehicle; and
detect misalignment of the beam axis of the beam sensor in the vertical plane including the beam axis of the beam sensor in accordance with the sum of the determined values of the calculated percentage.

8. The apparatus for detecting axial misalignment according to claim 6, wherein the at least one preceding vehicle comprises a plurality of preceding vehicles; and the alignment detection unit is configured to:
determine whether a height of one of the plurality of preceding vehicles is higher than a reference height; and
calculate, in response to determining that the height of one of the plurality of preceding vehicles is higher than the reference height, the calculated percentage for the remaining preceding vehicles without calculating the calculated percentage for the one of the plurality of preceding vehicles.

9. The apparatus for detecting axial misalignment according to claim 6, wherein, in response to the at least one preceding vehicle including a preceding vehicle normally recognized by the first target recognition task, and a preceding vehicle is abnormally recognized by the first target recognition task, the alignment detection unit is configured to:

determine a value of the calculated percentage for each of the normally recognized preceding vehicle and the abnormally recognized preceding vehicle;

detect misalignment of the beam axis of the beam sensor in the vertical plane including the beam axis of the beam sensor in accordance with the determined value of the calculated percentage for each of the normally recognized preceding vehicle and the abnormally recognized preceding vehicle;

determine whether the detected misalignment of the beam axis is upward misalignment or downward misalignment; and obtain a quantity of the detected misalignment of the beam axis.

10. The apparatus for detecting axial misalignment according to claim 1, wherein the alignment detection unit is configured to:

repeatedly obtain a value of a height of the at least one preceding vehicle;

determine a value of the calculated percentage for each of the obtained values of the height of the at least one preceding vehicle;

calculate a sum of the determined values of the calculated percentage for the respective values of the height of the at least one preceding vehicle; and detect misalignment of the beam axis of the beam sensor in the vertical plane including the beam axis of the beam sensor in accordance with the sum of the determined values of the calculated percentage.

11. The apparatus for detecting axial misalignment according to claim 10, wherein the at least one preceding vehicle comprises a plurality of preceding vehicles; and the alignment detection unit is configured to:

determine whether a height of one of the plurality of preceding vehicles is higher than a reference height; and calculate, in response to determining that the height of one of the plurality of preceding vehicles is higher than the reference height, the calculated percentage for the remaining preceding vehicles without calculating the calculated percentage for the one of the plurality of preceding vehicles.

12. The apparatus for detecting axial misalignment according to claim 10, wherein, in response to determining the at least one preceding vehicle including a preceding vehicle normally recognized by the first target recognition task, and a preceding vehicle is abnormally recognized by the first target recognition task, the alignment detection unit is configured to:

determine a value of the calculated percentage for each of the normally recognized preceding vehicle and the abnormally recognized preceding vehicle;

detect misalignment of the beam axis of the beam sensor in the vertical plane including the beam axis of the beam sensor in accordance with the determined value of the calculated percentage for each of the normally recognized preceding vehicle and the abnormally recognized preceding vehicle;

determine whether the detected misalignment of the beam axis is upward misalignment or downward misalignment; and obtain a quantity of the detected misalignment of the beam axis.

13. The apparatus for detecting axial misalignment according to claim 1, wherein the at least one preceding vehicle comprises a plurality of preceding vehicles; and the alignment detection unit is configured to:

determine whether a height of one of the plurality of preceding vehicles is higher than a reference height; and calculate, in response to determining that the height of one of the plurality of preceding vehicles is higher than the reference height, the calculated percentage for the remaining preceding vehicles without calculating the calculated percentage for the one of the plurality of preceding vehicles.

14. The apparatus for detecting axial misalignment according to claim 13, wherein the alignment detection unit is configured to:

determine whether a measured intensity of illuminance around the own vehicle is equal to or higher than a threshold;

set, in response to determining that the measured intensity of illuminance around the own vehicle is lower than the threshold and the height of the at least one preceding vehicle is measured by a sensor installed in the own vehicle, a value of the reference height to be lower than a value of the reference height used for a case where the measured intensity of illuminance around the own vehicle is equal to or higher than the threshold.

15. The apparatus for detecting axial misalignment according to claim 14, wherein, in response to determining the at least one preceding vehicle including a preceding vehicle normally recognized by the first target recognition task, and a preceding vehicle is abnormally recognized by the first target recognition task, the alignment detection unit is configured to:

determine a value of the calculated percentage for each of the normally recognized preceding vehicle and the abnormally recognized preceding vehicle;

detect misalignment of the beam axis of the beam sensor in the vertical plane including the beam axis of the beam sensor in accordance with the determined value of the calculated percentage for each of the normally recognized preceding vehicle and the abnormally recognized preceding vehicle;

determine whether the detected misalignment of the beam axis is upward misalignment or downward misalignment; and obtain a quantity of the detected misalignment of the beam axis.

16. The apparatus for detecting axial misalignment according to claim 13, wherein, in response to determining the at least one preceding vehicle including a preceding vehicle normally recognized by the first target recognition task, and a preceding vehicle is abnormally recognized by the first target recognition task, the alignment detection unit is configured to:

determine a value of the calculated percentage for each of the normally recognized preceding vehicle and the abnormally recognized preceding vehicle;

detect misalignment of the beam axis of the beam sensor in the vertical plane including the beam axis of the beam sensor in accordance with the determined value of the calculated percentage for each of the normally recognized preceding vehicle and the abnormally recognized preceding vehicle;

determine whether the detected misalignment of the beam axis is upward misalignment or downward misalignment; and obtain a quantity of the detected misalignment of the beam axis.

17. The apparatus for detecting axial misalignment according to claim 1, wherein, in response to the at least one preceding vehicle including a preceding vehicle normally recognized by the first target recognition task, and a preceding vehicle is abnormally recognized by the first target recognition task, the alignment detection unit is configured to:
- determine a value of the calculated percentage for each of the normally recognized preceding vehicle and the abnormally recognized preceding vehicle;
- detect misalignment of the beam axis of the beam sensor in the vertical plane including the beam axis of the beam sensor in accordance with the determined value of the calculated percentage for each of the normally recognized preceding vehicle and the abnormally recognized preceding vehicle;
- determine whether the detected misalignment of the beam axis is upward misalignment or downward misalignment; and
- obtain a quantity of the detected misalignment of the beam axis.

* * * * *